US008352384B2

(12) United States Patent
Mansinghka et al.

(10) Patent No.: US 8,352,384 B2
(45) Date of Patent: Jan. 8, 2013

(54) COMBINATIONAL STOCHASTIC LOGIC

(75) Inventors: Vikash Kumar Mansinghka, Cambridge, MA (US); Eric Michael Jonas, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 980 days.

(21) Appl. No.: 12/397,754

(22) Filed: Mar. 4, 2009

(65) Prior Publication Data

US 2009/0228238 A1 Sep. 10, 2009

Related U.S. Application Data

(60) Provisional application No. 61/033,540, filed on Mar. 4, 2008.

(51) Int. Cl.
*G06F 15/18* (2006.01)
*G06F 9/44* (2006.01)
*G06F 17/50* (2006.01)
*H03K 17/687* (2006.01)
(52) U.S. Cl. ............... 706/1; 706/52; 703/13; 327/603
(58) Field of Classification Search .............. None
See application file for complete search history.

(56) References Cited

U.S. PATENT DOCUMENTS

| 7,457,367 | B2 | 11/2008 | Farhang-Boroujeny et al. |
| 2003/0182631 | A1 | 9/2003 | Tsochantaridis et al. |
| 2004/0022348 | A1 | 2/2004 | Heumann |
| 2005/0216274 | A1 | 9/2005 | Kim |
| 2005/0262394 | A1 | 11/2005 | Yasukawa et al. |
| 2006/0150129 | A1 | 7/2006 | Chiu et al. |
| 2007/0076669 | A1 | 4/2007 | Boroujeny et al. |
| 2008/0273632 | A1 | 11/2008 | Farhang-Boroujeny et al. |
| 2009/0003483 | A1 | 1/2009 | Farhang-Boroujeny et al. |

FOREIGN PATENT DOCUMENTS

WO   WO2008063183   5/2008

OTHER PUBLICATIONS

Laraway, et al., "Implementation of a Markov Chain Monte Carlo Based Multiuser/MIMO Detector," IEEE Trans. on Circuits and Systems-1: Regular Papers 56(1): 246-255 (2009).
International Search Report mailed Apr. 30, 2009 in corresponding International Application No. PCT?US2009/36024.
Bolic, M., "Architectures for Efficient Implementation of Particle Filters," USA State University of New York at Stony Brook, 2004, pp. 1-105.
Bonawitz, K., "Composable Probabilistic Inference with BLAISE," PhD thesis, Massachusetts Institute of Technology, 2008, pp. 1-192.

(Continued)

*Primary Examiner* — Alan Chen
(74) *Attorney, Agent, or Firm* — Anderson Gorecki & Rouille LLP

(57) ABSTRACT

Circuits that solve stochastic problems and techniques for operating them. These natively stochastic circuits may produce samples from probability distributions of interest for particular stochastic problems, and may be combined together in any suitable way to yield potential solutions to stochastic problems. In some implementations, the stochastic circuits may generate samples from conditional probability distributions conditioned on input data provided to the stochastic circuits. The circuits may be constructed from multiple interconnected stochastic subcircuits such that a circuit may produce a sample from a joint probability distribution, or from a marginal distribution of a joint distribution. These circuits may be used to implement stochastic sampling algorithms to solve stochastic processes, and may include stochastic subcircuits that operate concurrently.

99 Claims, 14 Drawing Sheets

OTHER PUBLICATIONS

Boole, G., "An Investigation of the Laws of Thought," Chapters I and II, 1854, pp. 1-22.

Cheemalavagu, S. et al., "Ultra low-energy computing via probabilistic algorithms and devices: CMOS device primitives and the energy-probability relationship,"Proc. of the 2004 International Conference on Solid State Devices and Materials, pp. 402-403.

Del Moral, P. et al., "Sequential Monte Carlo Samplers," Department of Statistics and Department of Computer Science, University of British Columbia, Vancouver, BC, Canada, first version Dec. 2002, revised May 2004 and Dec. 2005, pp. 1-29.

Gaines, B.R., "Stochastic Computing systems," Advances in Information Systems Science, 2, 1969, pp. 1-138.

Geman, S. et al., "Stochastic Relaxation, Gibbs Distributions and the Bayesian Restoration of Images," IEEE Transactions on Pattern Analysis and Machine Intelligence, vol. PAMI-6, No. 6, Nov. 1984, pp. 1-21.

Genov, R. et al., "Stochastic Mixed-Signal VLSI Architecture for High-Dimensional Kernel Machines," Advances in Neural Information Processing Systems, 14, pp. 1-7.

Hillis, W.D., "The Connection Machine," MIT Press, 1989, pp. 1-29.

Jaynes, E.T., "Probability Theory: The Logic of Science," Cambridge University Press, Apr. 2003, pp. 1-95.

Kahan, W., "On a proposed floating-point standard," ACM SIGNUM Newsletter, 14:13-21, 1979.

Mansinghka, V. et al., "Stochastic Digital Circuits for Probabilistic Inference," Computer Science and Artificial Intelligence Laboratory Technical Report, Massachusetts Institute of Technology, Nov. 23, 2008, pp. 1-12.

Marsaglia, G., "Xorshift RNGs," Journal of Statistical Software, 2003, pp. 1-6.

Metropolis, N. et al., "Equations of State Calculations by Fast Computing Machines," Journal of Chemical Physics, vol. 21, No. 6, Jun. 1953, pp. 1-6.

Murray, A.F. et al., "Pulse-stream VSLI neural networks mixing analog and digital-techniques," Neural Networks, IEEE Transactions, 2(2):193-204, 1991.

Qian, W. et al., "The Synthesis of Stochastic Circuits for Nanoscale Computation," University of Michigan, 2007, pp. 1-8.

Shannon, C., "A Symbolic Analysis of Relay and Switching Circuits," PhD thesis, Massachusetts Institute of Technology, 1940, pp. 1-72.

Tappen, M.F. et al., "Comparison of graph cuts with belief propagation for stereo, using identical MRF parameters," Proc. ICCV, 2003, pp. 1-8.

Von Neumann, J., "Probabilistic logics and synthesis of reliable organisms from unreliable components," C. Shannon and J. McCarthy, editors, Automata Studies, pp. 43-98, Princeton University Press, 1956.

| IN | OUT | P |
|----|-----|---|
| 0 0 0 0 | 0 | 1 |
| 0 0 0 0 | 1 | 0 |
| 0 0 0 1 | 0 | 15/16 |
| 0 0 0 1 | 1 | 1/16 |
| ⋮ | ⋮ | ⋮ |
| 1 1 1 1 | 0 | 1/16 |
| 1 1 1 1 | 1 | 15/16 |

FIG. 13B     FIG. 13C

COMBINATIONAL STOCHASTIC LOGIC

RELATED APPLICATIONS

The present application claims priority under 35 U.S.C. §119(e) to U.S. Provisional Patent Application No. 61/033,540, entitled "Combinational Stochastic Logic," filed on Mar. 4, 2008, which is herein incorporated by reference in its entirety.

BACKGROUND

Many computational problems can be categorized as either deterministic or stochastic. In general, in a deterministic problem, an "answer" to the problem, or a next state of a solution of the problem, is computable with certainty based on input values and the current state of the problem. In general, in a stochastic problem, the "answer" to the problem, or a next state of a solution of the problem, is uncertain and defined in accordance with a probability distribution.

One type of stochastic problem that occurs often in the real world arises when any of multiple possible events could have generated an observed scenario. Data can be collected about a scenario that exists and used to compute probabilities that the observed scenario is caused by each of the possible events. Based on the determined probabilities, decisions can be made. For example, decisions may be made assuming that the most probable event actually gave rise to the scenario. Though, in more complex scenarios, decisions may be made in other ways, such as by evaluating, based on the probabilities, an expectation that a particular decision will give rise to a give or bad result.

Image analysis is an example of a field that includes stochastic problems. In one stereo vision problem, two different images may be generated by two digital cameras placed close to one another—such as when approximating human eyes for a robotics problem. It may be desirable to determine, based on the images themselves, a distance to a particular object in the images. Each of the stereo images represents measurements of light traveling to a camera from the object. Because the light will travel in predictable paths when reflecting off objects, it may seem that the position of the object from which that light is reflected could be deterministically computed. However, in reality, many factors could influence the actual light measured at the camera. The shape, size and surface properties of the object as well as the position, strength and other properties of the light source may influence what is measured. As a result, any of a number of different objects at different distances from the cameras may generate the same or similar measured values.

Accordingly, when stereo image analysis is treated as a stochastic problem, what is computed is the probability that particular objects in particular locations gave rise to the measured images. This data can be used, for example, to guide a robot using the stereo vision system. The control algorithm of the robot may simply react to the data provided by stochastic analysis of the image as if the most probable objects are actually present. A more complex control algorithm may guide the robot to maximize the expectation that it will reach its intended destination without getting entangled with objects or minimize the expectation that the robot will be damaged due to collisions with objects.

Text analysis is another example of a stochastic problem: Given a set of words in the text of a document, it may be desirable to identify the topic of the document. The set of words in the document defines a scenario that could have been created by any of a number of events. Specifically, it is possible that the document could be on any of a number of topics. Similarly, if the point of the text analysis is to determine the point of view of the author, it is possible that any of a number of points of view will give rise to the words found in the document. When treated as a stochastic problem, it may be possible to determine probabilities associated with these events such as that the document describes a particular topic or that the author subscribed to a particular point of view. These probabilities can then be used in decision making, such as whether to return the document in response to a particular search query or how to catalog the document.

Other problems similarly follow this pattern and can be solved by determining probabilities of events that may give rise to a particular observed scenario. Such problems are generally characterized by a conditional probability density function. The conditional probability density function defines the probability of events within a set of events given that a particular scenario exists. From observations that tell what scenario exists and the probability density function, the probability that each event in the set gave rise to the observed scenario can be computed.

A second type of stochastic problem arises when it is desired to determine values for values for variables defining a scenario, but the values of these variables have a random component. This can arise in many situations where the variables cannot be directly observed, for example when they describe the microscopic structure of a chemical system of interest, or when they describe the clustering of biological, text, or demographical data. In all these settings, while the variables cannot be specified deterministically, they can be described in terms of a probability distribution. By selecting values according to the probability distribution, typical values may be obtained for inspection, or for use in solving other, larger stochastic problems.

A third type of stochastic problem arises when it is theoretically possible, but practically very difficult, to compute a value for some parameter in a scenario. If the scenario can be described in accordance with a probability distribution that assigns a high probability to the actual value of the parameter, selecting a value in accordance with the probability leads to a good approximation of the actual value. The widely used technique of Monte Carlo approximation provides a rich source of examples of this kind of stochastic problem.

Each of these types of problems has in common that it involves generating one or more samples in accordance with a probability distribution. Often, this process is complex and cannot be done by hand or mentally; accordingly, computers are necessary to solve a stochastic problem.

One traditional approach for using a conventional computer to solve a stochastic problem is to determine a set of possible events that is possible under the probability distribution and then computing the probability of each potential event. In the context of the stereovision problem, this may involve identifying all potential distances to an object and calculating a probability that each distance is the correct distance.

These probabilities are typically computed with high precision, to ensure that they closely approximate the actual probabilities. Accordingly, when a stochastic problem is approximated as a deterministic problem, it may be computed using 64-bit floating point processes, such that a probability of each event occurring (or each output being the "correct" output) is calculated and stored with 64-bit precision.

SUMMARY

Applicants have recognized and appreciated that there are many disadvantages to current techniques used for computationally solving stochastic problems. Described herein are various principles and techniques that may be used, independently or in combination, to solve stochastic problems. These principles may be used to create and/or operate stochastic circuits that randomly generate samples according to a probability distribution function modeling the stochastic problem. The circuit may be operated to generate a stream of such samples based on data representative of a scenario for which a stochastic problem is to be solved.

In some cases, a generated sample may itself be the solution of the stochastic problem. Such may be the case if the stochastic circuit is configured to generate samples in accordance with a probability distribution for which a typical value is to be determined or if the stochastic circuit is configured to generate samples in accordance with a probability distribution that attaches a high probability to the answer to a problem to be solved. In other cases, the generated stream of samples may be used in solving the stochastic problem. For example, the frequencies of occurrence of samples defining possible events/outputs can be used to compute the probability of occurrence of those events in the scenario; in some cases, a likelihood of potential solutions. These probabilities can be used as in conventional systems to solve the stochastic problem, such as by determining and acting on a potential event or a set of potential events.

In one embodiment, there is provided an apparatus. The apparatus comprises zero or more input terminals, at least one output terminal from which is output samples from an overall conditional probability distribution conditioned on input received on the zero or more input terminals, and a plurality of stochastic subcircuits. Each stochastic subcircuit includes zero or more input subterminals and at least one output subterminal, and is configured to produce from its at least one output subterminal samples from a conditional probability distribution conditioned on input received on the zero or more input subterminals. In the apparatus, the plurality of stochastic subcircuits are interconnected to form a stochastic circuit that produces samples from the overall conditional probability distribution. Each of the plurality of stochastic subcircuits generates the samples based at least in part on the conditional probability distribution and a source of randomness.

In some implementations of such an apparatus, the overall probability distribution may be a joint probability distribution based on the conditional probability distributions of the plurality of stochastic subcircuits. Samples generated by each of the plurality of stochastic subcircuits may be output on the at least one output terminal to generate a sample from the joint probability distribution, or samples generated by a subset of the plurality of stochastic subcircuits may be output on the at least one output terminal to generate a sample from a marginal joint probability distribution of the joint probability distribution, or any other suitable sample may be generated.

In another embodiment, there is provided an apparatus comprising a stochastic circuit. The stochastic circuit includes zero or more input terminals and at least one output terminal, and produces on the at least one output line samples from a conditional probability distribution conditioned on input data provided on the zero or more input terminals. Generation of the samples by the stochastic circuit is based at least in part on the conditional probability distribution and on a source of randomness.

In a further embodiment, there is provided a method of operating a stochastic circuit to generate samples from an overall conditional probability distribution, where the overall conditional probability distribution is related to a plurality of conditional probability subdistributions. The method comprises concurrently operating two or more stochastic subcircuits such that each generates samples from a conditional probability subdistribution. The concurrently operating comprises generating, during a first iteration, a first sample from a first stochastic subcircuit, where the first sample is generated according to a first conditional probability distribution, and generating, during a second iteration, a second sample from the second stochastic subcircuit, where the second sample is generated according to a second conditional probability distribution that is conditioned on the first sample. The concurrently operating further comprises generating, during the second iteration, a next sample from the first stochastic subcircuit. The method further comprises generating a sample from an output subcircuit that is a sample from the overall conditional probability distribution.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 13A, 13B, 13C, and 13D show block diagrams of exemplary stochastic digital circuits that may be used to implement a Gibbs sampling algorithm for image processing applications;

DETAILED DESCRIPTION

Figure 1:
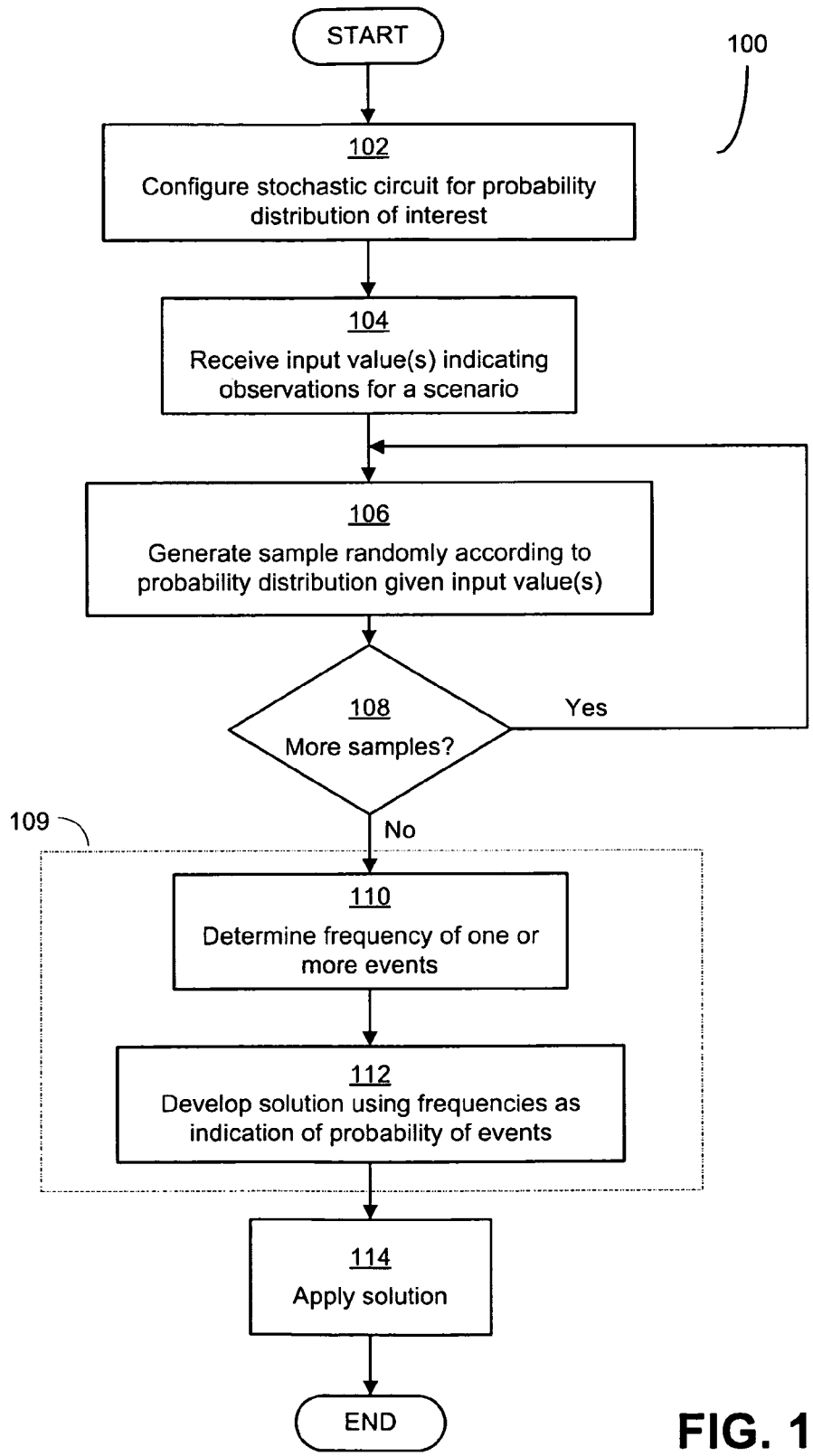
FIG. 1 shows a flowchart of an exemplary process for operating a stochastic digital circuit to produce a sample from a probability distribution of interest.

Applicants have recognized and appreciated that conventional approaches to solving stochastic problems electronically are inherently limited because they use deterministic computers. As a result, such solutions are based on deterministic approximations of stochastic processes. The deterministic solutions tend to use high-precision floating point arithmetic. Such approximations may require amounts of time and/or processing resources that are unacceptably or inefficiently large.

As an example, deterministic approximations of a stochastic problem may involve determining first each potential event that may give rise to a set of observations and then determining the likelihood of its occurrence before making a decision. For a given problem the number of potential events may be vast, and it may take a lot of time to compute probabilities all of the events.

As a scenario changes over time (e.g., as inputs vary or are refined), it may be necessary to recompute these probabilities. Each computation may take a large amount of time and processing resources because of the precision with which the operations are carried out; typically 64 bits. Applicants have appreciated that this precision—in addition to increasing the amount of time and processing resources necessary to perform each calculation—is not necessary, as stochastic problems have inherent to them some degree of randomness and uncertainty. Typically, the amount of inherent uncertainty in a problem eclipses the high precision used in computing approximations of these problems and thus time and space is used unnecessarily in solving stochastic problems.

Applicants have recognized that much of this time and processing resources is wasted because of the characteristics of deterministic circuits used to perform these computations; they require clearly-defined inputs, outputs, and states. Applicants have additionally recognized advantages that are offered by circuits that are natively stochastic and may be used to generate (and produce as output) samples from probability distributions rather than certain outputs given certain inputs. By operating with a degree of randomness, and producing uncertain, probabilistic samples from probability distributions, these circuits could be used to generate samples in accordance with a probability distribution and therefore used to solve stochastic problems.

Further, Applicants have recognized and appreciated that natively stochastic circuits can be developed through interconnections of stochastic logic elements, each of which itself operates according to a conditional probability distribution. By representing a larger problem in this fashion, the task of setting up a problem may be simplified, avoiding the need to compute an overall conditional probability distribution relating observed data to a set of events of interest. Moreover, the resulting stochastic circuit has components that can be operated in parallel, reducing the time required to solve a stochastic problem.

Stochastic digital circuits could be used to generate probability distributions relating to a problem of interest, and could be used to generate samples from these probability distributions. Using these circuits, samples according to the probability distribution can be generated efficiently. As a result, solutions to stochastic problems may be generated and used to quickly and efficiently make decisions regarding a stochastic problem, vastly increasing the potential applicability of stochastic problem solving.

Accordingly, disclosed herein are various techniques for using stochastic digital circuits to produce samples from distributions of interest, and design patterns for creating, combining, and using stochastic digital circuits to model and sample probability distributions of interest that may be useful in producing a solution to a stochastic problem. The output produced by a stochastic digital circuit may be in any suitable format, including one or more samples representative of events in accordance with a conditional probability density function associated with a scenario, probabilities of one or more events computed based on the conditional probability distribution function or the conditional probability distribution function. Accordingly, in some implementations a single sample may be output, while in other implementations multiple samples may be output over time. In implementations which operate on multiple samples, in some cases the samples may be aggregated and probabilities associated with these samples may be calculated. Outputs in these forms, or other suitable forms, may then be used for solving a stochastic problem in any suitable way, including using techniques as is known in the art for decision-making in stochastic systems.

Stochastic circuits operating according to the principles described herein can compute samples according to a probability distribution more efficiently than a conventional system that uses high-precision floating point arithmetic. For example, when using stochastic circuits, it is generally not necessary to compute probabilities for all possible events to solve a stochastic problem. Rather, a meaningful solution to a stochastic problem is frequently obtainable using a relatively small number of samples, because of the speed with which estimates of probabilities taken from random samples converge. Thus, when using stochastic circuits that generate samples from a conditional probability distribution, probabilities of multiple possible events can be quickly calculated for each of the most likely events. Moreover, because probabilities may be determined based on the aggregate results of multiple samples, the precision required for computing each sample is less, reducing the need for floating point arithmetic or other computationally-expensive techniques.

Stochastic digital circuits may be implemented in any suitable manner to produce samples, examples of which are described below. These circuits may be implemented to introduce randomness in their outputs such that the circuits receive inputs and produce outputs representative of samples from a conditional probability distribution based on the inputs. In other words, in some embodiments of the invention an output of the stochastic digital circuit may be a sample from the probability distribution P(Event|Input)—the probability that an event represented by a particular output gave rise to the particular input.

In terms of one of the illustrative examples given above, when applied to a stereovision problem, the sample produced by a stochastic digital circuit may represent a distance to a particular object that could have given rise to inputs describing an observed object (e.g., input image data). In some implementations, these samples may be processed to generate probabilities used in decision making. For example, such data may describe the certainty (i.e., the probability) that each possible distance actually gave rise to the image that was observed.

Stochastic circuits may be implemented using any suitable circuit construction techniques. Design techniques used in constructing deterministic digital logic may be used. In particular, known processes for manufacturing semiconductor chips may be used to make stochastic circuits. Likewise, known design tools may be used. Stochastic circuits, for example, may be implemented using programmable logic devices, such as Field Programmable Gate Arrays (FPGAs). Alternatively, Application Specific Integrated Circuit (ASIC) design techniques may be used. Though, other technologies, such as those used for molecular/biological or DNA computers, may be used.

Though, a stochastic digital circuit may differ from a traditional digital circuit in that it will operate on some source of randomness. Any suitable source of randomness may be used. For example, the stochastic circuit may leverage some inherent randomness from its inherent design, such as fleeting and variable charge on trace lines in electronic circuits or variability in molecular structure for molecular/biological or DNA computers. As another example, one or more random or pseudo-random number generators may be used—such as conventional, pseudo-random number generators. As is known, a pseudo-random number generator may be implemented as a circuit that provides a bitstream of a particular length that contains no identifiable pattern of bits. When the length of the bit stream is longer than an interval of interest, such as the duration over which stochastic samples are to be generated, the output of the pseudo-random number generator may be regarded as random. Though, other sources of randomness may also be used, as embodiments of the invention are not limited in this respect.

Stochastic circuits may be used alone or combined in any suitable manner, both with other stochastic circuits and/or with deterministic circuits to form stochastic machines and processors able to provide solutions to any suitable stochastic problem. A stochastic circuit, for example, may be used as part of a stochastic processor defined to solve a particular stochastic problem. The stochastic processor may accept inputs representing an observation for a particular scenario and may generate a decision appropriate for that scenario.

Though, in some embodiments, a stochastic circuit may be used as a portion of a larger computing environment, such as where the stochastic circuit is part of a deterministic computer, such as when implemented as a co-processor for a deterministic processor. In some such implementations, the stochastic co-processor may provide a sample or stream of samples according to a probability distribution function or, in other implementations, the stochastic processor may output the probabilities of certain events relating to the stochastic problem (i.e., a likelihood of solutions being the correct solution). These samples and/or probabilities may be used by the deterministic processor in making decisions.

A stochastic processor or co-processor may be adapted for solving a particular stochastic problem by including a stochastic circuit that generates samples according to a conditional probability distribution function associated with the particular problem. The stochastic processor or co-processor may have a fixed configuration or, in embodiments in which programmable circuitry is used to implement the stochastic circuit, may be configured to be useful in solving different problems at different times.

In some cases, stochastic digital circuits may be implemented using multiple stochastic circuit elements, each of which operates according to a probability distribution function. These stochastic circuit elements may be interconnected using techniques and circuit elements like those used in convention deterministic logic design. Some or all of these circuit elements may operate simultaneously, further reducing the time required to solve the stochastic problem. Such parallel operation may be achieved, for example, using registers, latches, and other circuit elements known to be useful in providing pipelined or other forms of parallel operation in a conventional digital logic circuits. Though, any suitable designs giving rise to parallel circuit operation may be used.

The interconnections among the stochastic circuit elements may be made to implement an overall conditional probability distribution associated with a stochastic problem to be solved. To aid in the creation of such stochastic circuits, certain stochastic design patterns that occur in designs of stochastic circuits for solving many types of problems have been identified. Interconnections of stochastic circuit elements that implement these design patterns may be defined. A stochastic circuit can be constructed using these subcircuits when solving a particular problem.

Stochastic circuits may be constructed in a programmable device, such as a Field Programmable Gate Array. A stochastic processor, which is defined to solve a particular stochastic problem, may be implemented using such FPGAs. The stochastic processor may completely solve a stochastic problem. In some embodiments, a stochastic processor may be used as a portion of a larger computing environment, such as where the stochastic processor is a component of a deterministic computer. The stochastic processor may be adapted to solve a stochastic problem for the deterministic computer—or may be configurable to solve one or more stochastic problems for the deterministic computers—such that the stochastic processor operates as a coprocessor for a deterministic processor. In some such implementations, the stochastic processor may provide a stream of samples according to a probability distribution function or, in other implementations, the stochastic processor may output the probabilities of certain events relating to the stochastic problem (i.e., a likelihood of solutions being the correct solution).

Accordingly, unless specified otherwise, where reference is made herein the "stochastic digital circuits," it should be appreciated that it may equally refer to one or more of stochastic circuit elements, stochastic subcircuits, stochastic circuits, and/or stochastic processors, or any other way in which the principles described herein may be embodied. It should be further appreciated that while below illustrative categories of stochastic digital circuits are described—including these four and others—embodiments of the invention are not limited to being implemented in any specific manner or as any particular type(s) of circuitry.

FIG. 1 shows one example of a process for solving a stochastic problem using a stochastic circuit in accordance with the principles described herein. The process of FIG. 1 is presented for ease of understanding the operations of some embodiments of the invention, but does not characterize the operations of all embodiments of the invention. Accordingly, it should be appreciated that the process of FIG. 1 is only illustrative, and that other stochastic digital circuits may be implemented using more or fewer acts than are shown in FIG. 1, or may implement a different process entirely. Embodiments of the invention are not limited to implementing the principles described herein in any particular manner.

The process 100 begins in block 102, in which the digital circuit is configured to act as a stochastic circuit for a probability distribution of interest. Acting as a stochastic circuit for a probability distribution of interest may mean producing samples according to a conditional probability density function (pdf) associated with the stochastic problem. The pdf of a stochastic problem indicates, for inputs obtained representing a scenario, the probabilities that each of a plurality of events gave rise to the scenario.

The specific conditional probability distribution of interest will depend on the problem being solved. For example, the probability distribution function for a stereo image analysis problem likely will be different than the probability distribution function for a text analysis problem. Likewise, when selecting typical values in a system, the pdf will be selected that models. When generating a sample that represents an estimated solution to a deterministic problem, the pdf will be selected to create a high likelihood that the sample approximates the deterministic answer. Accordingly, for any given problem, the appropriate probability density function may be determined in any suitable way, including using techniques as are known in the art.

It should be appreciated that however the distribution is determined, the distribution may be any suitable distribution associated with the problem. For example, the problem may be one that characterized by a standard, known distribution such as the Bernoulli, binomial, exponential, Gaussian, and others, and in these cases the distribution may be a known distribution. In other cases, however, the problem may be characterized by a non-standard probability distribution, and the probability distribution configured in block 102 may be a unique, non-standard distribution.

Once the probability distribution function of interest is obtained, a circuit may be configured to receive an input and output samples according to that probability distribution function. The configuration of block 102 may take place in any suitable manner. In some embodiments, the configuration of block 102 may include configuring a reconfigurable digital circuit such that it represents the probability distribution of interest. This configuration may be performed according to configuration values provided to the digital circuit, or according to any other suitable data. Alternatively, configuration could entail using design tools to design and manufacture an ASIC, interconnecting discrete components or performing any other operations, whether now known or hereafter developed, to create a stochastic circuit. Regardless of the specific technique used, in block 102 the stochastic circuit is configured with the pdf associated with the stochastic problem to be solved.

Once the digital circuit is configured in block 102, processing for a specific scenario may be performed. An input may be received by the circuit in block 104. The input may represent measurements taken in a particular scenario. The number of values in the input and the nature of those values will depend on the problem to be solved. In a stereo vision problem, the inputs may be pixel values of images collected with stereo cameras. In a document classification problem, the inputs may be words in a document to be classified. Accordingly, the input may be any suitable digital values, and may be related to the scenario for which the stochastic problem is to be solved.

In block 106, the stochastic digital circuit generates samples based on the input provided in block 104. Each sample may indicate an event that may have occurred to give rise to the input. The circuit generates the samples in accordance with the probability distribution configured in block 102 such that, in a stream of samples output by the stochastic circuit, outputs indicating an event will occur with a frequency proportional to the probability, as defined by the configured probability distribution function, that the event gave rise to the observed input. The sample may be generated based at least in part on the input provided in block 104. As a simple example, for a particular input value IN=1, an output value may be generated based on the pdf of P(EVENT|IN=1). Accordingly, if the pdf indicates that P(EVENT= 1|IN=1)=0.4, there is a 40% chance that the stochastic digital circuit will generate a sample value of 1 when the input is a 1.

As discussed above, a stochastic problem has inherent to it some degree of randomness, and when generating samples the stochastic digital circuit operates with randomness. Accordingly, it should be appreciated that while there is a 40% chance that the stochastic digital circuit will generate a 1 as the sample, there is a 60% chance that the stochastic digital circuit will not generate a 1 as the sample, and may instead generate some other value (e.g., 0, 2, 10, etc.). The randomness of the circuit is used, for each sample, to generate an appropriate output value such that a stream of output values represents samples according to the configure probability density function.

One or more of these samples may be used to solve a stochastic problem. For example, some problems may be solved with a single sample, or single samples may provide some useful information that may be used apart from other samples that may be subsequently generated—thus, in these cases single samples may be processed individually. For other problems, a single sample may not yield useful information in solving a problem; it is not possible to calculate a probability distribution using only a single value. For such stochastic problems, multiple samples will be required to solve the stochastic problem. Though, the number of samples may depend on the nature of the problem to be solved or the observed order in which particular values are randomly generated. Accordingly, process 100 includes decision block 108 at which the process may loop back to block 106 to generate more samples or, if sufficient samples have been obtained, proceed to block 110 for further processing.

The determination of whether a sufficient number of samples have been generated may be made in any suitable way. If multiple samples are to be generated, the number of samples in a stream may in some cases depend on the nature of the problem to be solved. Some problems may be reliably solved after five samples, ten samples, one hundred samples, or any other suitable number related to the specifics of the stochastic problem to be solved and/or the scenario. The number of samples to be collected may be set in advance or may be identified adaptively based on the nature of the problem to be solved. For example, if a coarse estimate of probabilities of various events is required, the number of samples may be set relatively low. If higher precision is required, more samples may be taken such that the frequency with which samples representing particular events are generated can be more precisely computed. Alternatively, the number of samples to be taken may not be defined in advance. Rather, the distribution of samples actually observed may be used to determine whether enough samples have been taken.

For example, if the solution to the stochastic problem entails identifying the event that most likely gave rise to the input values, sampling may continue until one event is represented in the sampled output stream with a frequency above some threshold, such as 0.75, or with a frequency that is greater than all others by some threshold amount or percentage. As a further alternative, the number of samples taken may entail a combination of predetermined and adaptively selected limits. For example, a maximum and/or a minimum number of samples to generate may be defined. Within these limits, samples may be generated until a condition is identified.

Regardless of how the number of samples is determined, if in block 108 it is determined that this number (e.g., one or more) of samples has been collected, the process optionally proceeds to subprocess 109. If more samples are needed, then process 100 returns to block 106 where another sample is generated based on the input values.

If no more samples are needed, then subprocess 109 may optionally be performed, depending on the nature of the problem to be solved. Here subprocess 109 represents processing to convert of the stream of one or more samples that were generated into some useful information about the samples; for example, one or more probabilities that are used to determine a solution to the stochastic problem. In other embodiments, subprocess 109 may average sample values to determine a most likely result or otherwise generate a solution according to processing suitable for the type of problem to be solved. Of course, it should be appreciated that if the generated sample value or values are a desired solution, subprocess 109 may be omitted entirely.

In the embodiment illustrated, processing of the samples to solve the stochastic problem in subprocess 109 begins in block 110. This processing may be performed in the same FPGA or other semiconductor chip that is used to generate the samples. Though, processing following sample generation may be deterministic and may be performed in other hardware or using software components.

In some embodiments, the sample values may be output to components outside of the stochastic circuit for further processing. That processing may include any suitable action(s) taken based on the samples. In the embodiment illustrated, processing determines the probability that one or more events occurred to give rise to the observed input. Accordingly, processing is shown proceeding to block 110, which aggregates samples generated by the stochastic circuit to determine a frequency of one or more events represented by the samples.

In some embodiments, the processing of block 110 may result in determining a probability that a value will be generated as the sample, based on the samples actually generated. As a simple example in which there are only two possible events identified as 0 and 1, if the number of samples collected is 10, and six had a value of 1, the frequency output in block 110 may be 0.6 for the value 1, which may be taken as an indication that there is a 60% probability that the event 1 occurred. In this way, the probability that an event, represented by a particular sample value, gave rise to an observed input condition may be computed. Though, this same information may be expressed as a probability distribution or in any other suitable way.

Regardless of the manner in which the sample values are represented, this information may be used to generate a solution to the stochastic problem in block 112. As described above, a solution to a stochastic problem may be any suitable data about the stochastic problem, and may include data yielded by the stochastic circuit as a result of sample generation. For example, the solution may be one or more samples output by the stochastic digital circuit to be consumed by some other component of a larger system. In other embodiments, processing at block 112 may comprise outputting as a solution a value that was determined to be the most likely event to occur (i.e., the most frequently generated sample), or a set of values that were determined to be the most likely events to occur. The solution produced in block 112 may also be or include data other than event values, such as computed probabilities. It should be appreciated that these are only examples of the types of solutions that may be generated and that any other data or information may be additionally or alternatively be generated in block 112 as the solution(s) to a stochastic problem. Embodiments of the invention are not limited to outputting any particular solution or type of solution.

Upon outputting the one or more solutions in block 112, the process may then proceed to block 114 where the solution is applied. The manner in which the solution is applied may depend on the nature of the problem to be solved. It may entail generating a control signal for a robot or other machine. Though, for other problems, the solution may entail providing output to a human user, providing data to a deterministic computer or other actions. Regardless of the manner in which the solution is applied, process 100 then ends.

It should be appreciated that FIG. 1 shows only one iteration of a process. Once processing for one iteration is completed, another iteration may be performed based on new inputs. A stochastic processor may operate continuously to generate solutions to the stochastic problem. For example, in a control system for a robot or other machine, a solution may be generated based on input values. The solution may adjust a control values for the robot. New input values may then be measured and new control values computed. In this way, a stochastic processor may be used, in some embodiments of the invention, to provide real-time solutions in response to real-time inputs.

(It should be appreciated that, as used herein, "continuously" refers only to performing actions repeatedly over time, rather than only once. Some stochastic digital circuits that operate continuously may operate based on or in response to a periodic clock signal, and may only generate samples/solutions on clock ticks, but other embodiments of the invention are not so limited and may generate samples/solutions at any time).

It should be appreciated that, for ease of description, the values described above as potential events and samples were given as single-bit numeric values (e.g., an event/sample could be a 1), but embodiments of the invention are not limited to operating with events that are any particular value. There could be more than two events, such that each event may be identified by a digital value of multiple bits. For example, in the case of determining the range to an object, there may be numerous possible ranges, each of which could be represented by a multi-bit value. Though, the events need not correspond to numerical values at all. Sample values may encode text or characters, or any other data. Further, while many digital computers (e.g., conventional electronic computers) operate with two-state bits (i.e., high/low, 1/0), embodiments of the invention may operate in electronic or non-electronic digital computers that include bits with more states, such as three, four, etc.

It should be further appreciated that FIG. 1 is only one example of processing that may be performed and that various alternative embodiments may be constructed. For example, the order of processing steps is for simplicity of illustration. The order of some of the processing steps may be changed and some of the steps may be performed in parallel. For example, FIG. 1 illustrates that a frequency is determined in block 110 after a sufficient number of samples has been obtained. The frequencies may be updated at each sample and may even be used in determining whether a sufficient number of samples have been taken. Likewise, the process flow of FIG. 1 indicates that samples are computed iteratively. According to some embodiments, a stochastic circuit may have multiple pipelined stages such that, when a sample value is output, elements of the stochastic circuit have already partially computed the next sample value.

Further, FIG. 1 shows separately processing to generate samples according to a probability density function and processing on the generated samples. It should be appreciated that the effect of any post-sampling processing could alternatively be achieved by redefining the pdf in accordance with which sampling is performed. Accordingly, in some implementations the subprocess 109 of FIG. 1 may not be a separate subprocess, but rather may be included in the generation of a sample in block 106. It should be appreciated, then, that the specific process flow of FIG. 1 is merely illustrative of the types of processes that may be implemented in some embodiments of the invention and is not limiting. As a specific example of alternative process flows, a pdf could be used to generate samples of the value of a particular parameter, such as distance to an object. Those samples could then be processed by averaging them to output as an overall solution an estimate of the average distance to the object. The same result may be achieved by developing a pdf that represents average distance to the object. In this case, the solution can be generated without post-sampling processing.

Figure 2:
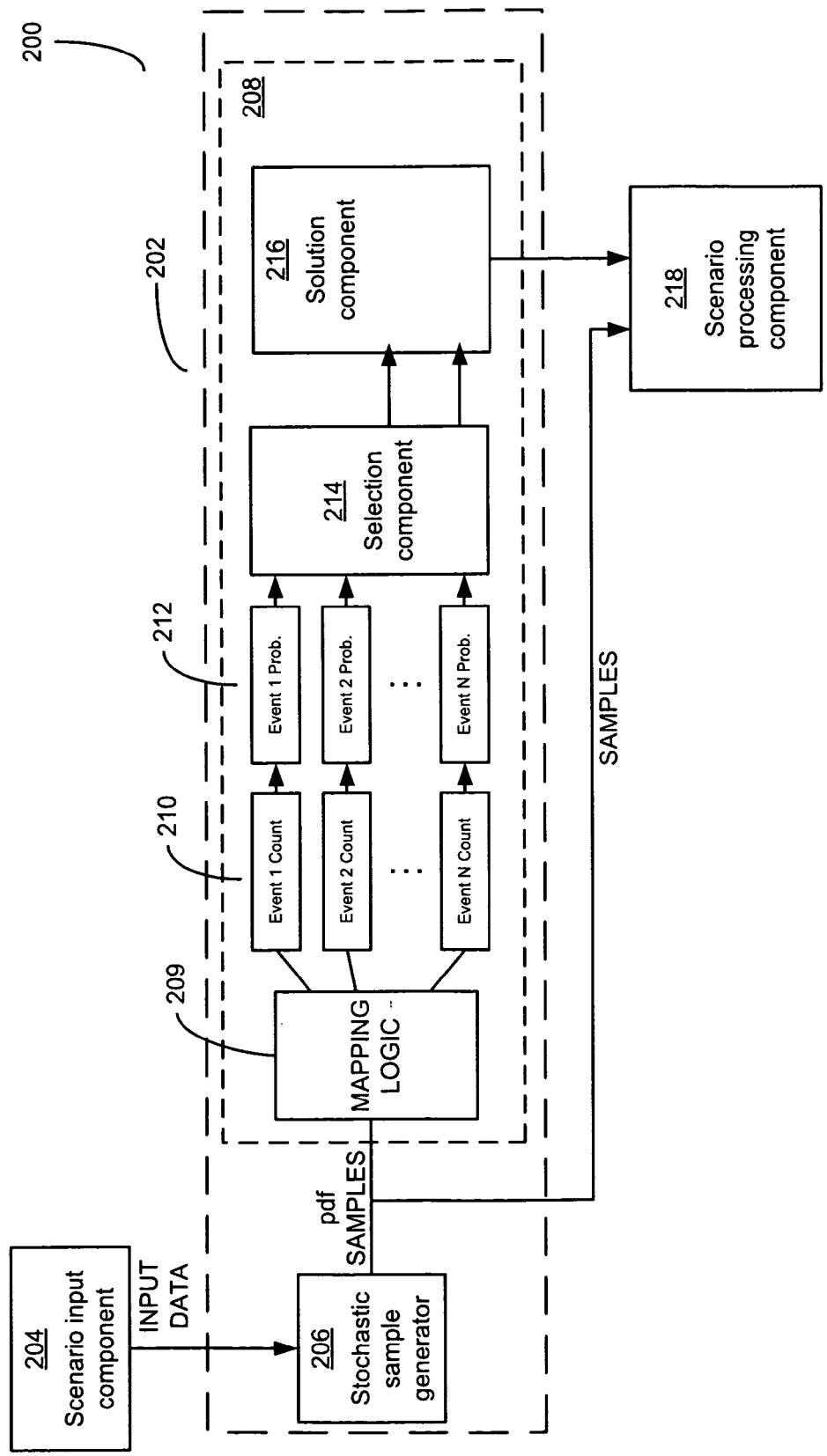
FIG. 2 is a block diagram of an exemplary computing device that includes stochastic components to solve a stochastic problem.

The process of FIG. 1 may be implemented using any suitable hardware components. FIG. 2 shows one example of a computing device 200 that may carry out the process 100 of FIG. 1. The computing device of FIG. 2 includes a stochastic sample generator 206 and a processing circuit 208 that may be components of one exemplary stochastic processor 202. It should be appreciated, however, that the computing device 200 of FIG. 2 is only illustrative of the types of computing devices that may implement techniques described herein, and that other computing devices are possible. For example, as described above in connection with FIG. 1, in some implementations a sample processing circuit 208 may not be implemented, as the sample generator 206 may be configured to generate samples according to a probability distribution that accounts for the deterministic processing that would be performed by the processing circuit 208. Further, in other implementations, individual samples may provide useful information and no processing may need to be performed on the samples. Accordingly, while the stochastic processor 202 of FIG. 2 includes both a stochastic sample generator 206 and a processing circuit 208, in some embodiments of the invention a stochastic processor 202 may only include a sample generator 206 or some other portion of the circuitry shown.

The stochastic sample generator 206 of FIG. 2 may be a stochastic circuit configured to generate samples from a probability distribution described by the pdf P(Event|In) that represents the distribution of interest for a stochastic problem to be solved. In some embodiments, the stochastic sample generator 206 may be constructed by interconnecting multiple stochastic circuit elements. Those stochastic circuit elements may be interconnected according to predefined design patterns, examples of which are provided below. However, the stochastic circuit elements may be connected in another suitable way or stochastic sample generator 206 may be implemented other than through the use of stochastic circuit elements.

Regardless of how implemented, the stochastic sample generator 206 accepts input data from a scenario input component 204. The scenario input component 204 may be any suitable component of a computing device 200 that provides data related to the scenario in which the computing device 200 is operating. The nature of input component 204 may depend on the nature of the problem to be solved. Such a component may be implemented using any suitable technology, including technology as known in the art for obtaining values of parameters representing a scenario. For example, the scenario input component 204 may be a user interface accepting data from a user. Scenario input component 204 may be one or more sensors collecting data about an environment or a processor of the computing device performing one or more processes that generate data, or any other component that provides data. In the example of a stereo vision problem, scenario input component 204 may be an interface circuit that interfaces to the frame buffers of the stereo cameras so that camera images may be obtained and processed.

Regardless of the nature of the input data and the manner in which it is obtained, the stochastic sample generator 206 may use this input data to produce samples in accordance with the pdf with which it is configured. Each sample may be associated with an event of the stochastic problem, and the samples may be generated with in proportion to their likelihood of occurring in the stochastic problem.

In some embodiments of the invention, the samples may be output by the stochastic processor 202 and provided to a scenario processing component 218 directly. The scenario processing component 218 may perform any suitable processing on these samples, including processing to generate a solution as described above in FIG. 1. In other embodiments of the invention, such as the one shown in FIG. 2, a stochastic digital circuit may include a processing circuit 208 to perform one or more processing actions on the samples to generate a solution to the stochastic problem.

In the embodiment of the invention shown in FIG. 2, as the samples are generated and output by the stochastic sample generator 206, the samples are received by processing circuit 208. Processing circuit 208 includes components to aggregate the samples and compute the probabilities of events associated with the samples occurring.

In the embodiment illustrated, those components include mapping logic 209. Mapping logic 209 may be implemented with conventional digital logic components that map sample values to particular events. In some embodiments, there may be a direct correspondence between sample values and events, such as in the case when the samples represent numeric values that define the events of interest. In other embodiments, a range of sample values may map to one event and mapping logic 209 may map sample values within the range to an appropriate event. In other embodiments, though stochastic sample generator 206 outputs a digital value, events may identify a classification or other non-numeric parameter. In this embodiment, mapping logic 209 may map the numeric sample values to non-numeric categories.

Regardless of the manner in which the samples are mapped to events, one approach for processing the sample values is to count the number of sample values associated with each event. The example embodiment of FIG. 2 includes multiple counters for this purpose. When a sample is received by the processing circuit 208, a corresponding counter 210 for an event represented by the sample is incremented (e.g., if the sample is a 1, the counter associated with the event 1 is incremented; if the sample is a 2, the counter associated with the event 2 is incremented; etc.).

The event counters may be organized in any suitable way. For example, event counters 210 may be created and assigned by control logic (not shown in FIG. 2) of the type used in conventional digital circuits as samples corresponding to events are generated. Alternatively, event counters 210 may be generated in advance based on a configuration of the stochastic processor 202 and a known finite number of events.

Regardless of how counters are associated with specific events, as counters 210 are incremented according to received samples, the probabilities 212 may also be updated, such that each event has an associated probability that represents the percentage of samples that were associated with that event. Counters 210 and probabilities 212 may be updated continuously as samples are generated. In the embodiment illustrated, event probability components 212 may be arithmetic or other circuitry that has the effect of dividing the count for each event by the total number of samples received. Though, probabilities may be computed in any suitable way by any suitable components.

In some embodiments, a solution to stochastic problem does not require data on all possible events. Rather, data on some subset of the events may be selected for further processing. Accordingly, processing circuit 208 may also include a selection component 214 to analyze the probabilities 212 and make selections. As discussed above, in some cases the processing by a stochastic digital circuit may include analyzing samples to determine a most likely event or a set of most likely events. Selection component 214 may therefore analyze the probabilities 212 in any suitable manner to determine a set of one or more events, and may indicate these events to a solution component 216 of the stochastic processor 202.

The solution component 216 may process the events and associated probabilities generated by the selection component 214 to derive a solution. As noted above, the specific processing may depend on the nature of the stochastic problem to be solved. Such processing may be performed using conventional processing techniques, though any suitable processing may be performed.

This solution may then be output to a scenario processing component 218. The nature of processing performed in any suitable way, including using technology as known in the art. Scenario processing component 218, for example, may implement a control decision for a robot or other machinery generated by solution component 216. In this embodiment, scenario processing component 218 may be a control actuator for the robot. In other embodiments, the solution may represent a classification of a document based on words in the document, and scenario processing component 218 may update a data structure in computer memory representative of the determined classification.

One advantage offered by some embodiments of the invention may be seen in the exemplary circuitry of FIG. 2. The circuitry of FIG. 2 may provide a quicker and simpler mechanism to compute probabilities of events than with conventional floating-point techniques. Previously, to determine the probabilities of a particular event/output based on some input, a floating point processor determined all possible events/outputs given the input and then calculated with high precision the likelihood/probability of each occurring. In the embodiment of FIG. 2, these probabilities may be calculated based instead on the samples generated and relatively simple counting operations.

Further, it is not necessary to compute probabilities for all possible events, particularly when the solution to the problem involves only identification of the most likely event or a small number of the most likely events. Samples will be generated more frequently for the more likely events, and a reasonable approximation of the probabilities of these events occurring can be computed, even if there are not enough samples to reliably compute the probabilities of the unlikely or less likely events.

Further, the reliability of the computed probabilities is relatively insensitive to the accuracy of much of the circuitry. The output of stochastic sample generator 206, by design, reflects a random process. Thus, many inaccuracies, including processing errors, will generally have a negligible effect on the ultimate computation. Thus, relatively low precision circuitry, including unreliable circuitry, may be used. A lower requirement for precision may simplify design, construction, and operation of circuits for solving stochastic problems, and reduce the size of such circuits and the time necessary to operate them to solve stochastic problems. A lower requirement for precision can also make it possible to use less precise computers (e.g., molecular computers).

Such simplifications in processing may enable use of stochastic processing in many applications where convention processing was heretofore infeasible. For example, in a robotic control system based on stereo vision, the simpler processing may enable real-time control or may enable real-time control in smaller devices that do not have sufficient processing power to support convention stochastic processing approaches. Similar benefits are obtained in other areas. As another example, speeding the rate at which stochastic problems can be solved may enable stochastic processing to be used for search engines or in other scenarios for which a user is waiting for an answer. Thus, while stochastic problem solving is described in connection with specific exemplary problems, the approaches described herein can e widely applied.

Having provided context in the form of descriptions of how some stochastic digital circuits may be operated and how they may be used in larger computing devices, a discussion of how stochastic digital circuits may be implemented is provided below. It should be appreciated, though, as described above, that stochastic digital circuits may be implemented in various ways. However, stochastic circuit elements, stochastic sub-circuits, stochastic circuits, and stochastic processors are four exemplary implementations, examples of each of which are provided below.

Further, it should be appreciated that while exemplary implementations are described below, these exemplary implementations are provided only for illustrative purposes to describe ways in which the principles described herein may be used in creating stochastic circuits and operating them to solve stochastic problems. These principles may be implemented in any suitable manner. Embodiments of the invention are not limited to carrying out these principles according to any specific technique, and as such are not limited to carrying these principles out according to any of the exemplary techniques and implementations described below.

Figure 3A:
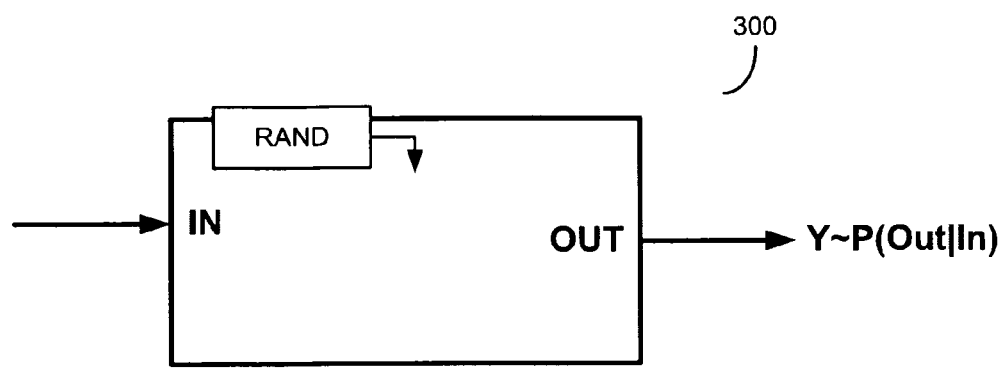
FIG. 3A is a block diagram of an illustrative implementation of a stochastic digital circuit.

FIG. 3A shows a block diagram that may be used to describe some embodiments of stochastic digital circuits. In the described embodiment, the stochastic circuit is implemented with digital logic, such as CMOS, though it is not a requirement that digital logic be used to implement a stochastic circuit. As shown in FIG. 3A, the stochastic digital circuit 300 includes a data input IN and a data output OUT, and some source of randomness. In embodiments in which the stochastic circuit is implemented with configurable logic, circuit 300 may additionally include at least one configuration input CONF that accepts data to configure the stochastic digital circuit 300 for a particular stochastic problem and probability distribution.

The data input IN generally accepts one or more input values that may be related to a scenario with which the stochastic problem is related (e.g., observations about the scenario, or other data). In some embodiments of the invention, the probability density function (pdf) on which the stochastic digital circuit executes may be conditioned on the inputs values related to the scenario/stochastic problem, such as in the case where the pdf may be described as P(Out|In).

The output terminal may also be one or more terminals, and the stochastic digital circuit 300 may output one or more samples from the probability distribution function on the output lines. In the example of FIG. 3, these outputs Y may be samples from the pdf P(Out|In).

It should be appreciated that, it is not a requirement that the input of the circuit 300 be variables representing a scenario. In some embodiments, a stochastic digital circuit may produce samples from a conditional probability distribution that is not conditioned on variable input data. The desired probability distribution may not be conditioned on anything such that the circuit is to generate samples according to a probability distribution that is not a conditional probability distribution. Accordingly, in some such embodiments, the circuit 300 of FIG. 3A may not include data input(s) IN, may not receive input values or may be regarded as receiving NULL inputs. In other embodiments, the input may be a predefined value such that the samples generated are in accordance with a conditional distribution given a defined condition.

As discussed above, in some embodiments of the invention stochastic digital circuits incorporate a degree of randomness into their processing to account for the randomness inherent in stochastic problems. FIG. 3A shows that the stochastic circuit 300 may include an additional component that provides random values that may be incorporated into the operation of the circuit when producing a sample value at the output. It should be appreciated that the randomness may be incorporated into stochastic digital circuit 300 in any suitable manner, and it may be derived from the stochastic digital circuit 300 itself or provided from outside the digital circuit 300. For example, the randomness may be based on some detected conditions of the stochastic digital circuits themselves, such as varying electrical conditions of some portion of the circuit 300. In a traditional electronic system, such varying electrical conditions are sometimes termed "noise." Some portion of the noise in a circuit is attributable to random causes, such as thermal noise in a semiconductor substrate, In a stochastic digital circuit, the magnitude, frequency or other parameter of such random noise may be detected and mapped to a bit pattern, thereby creating a random bit pattern. Alternatively, the randomness may be provided from outside the circuits, such as by a stream of randomly or pseudo-randomly generated bits. Accordingly, it should be appreciated that the random value input of the circuit 300 of FIG. 3A is shown partially within and partially without the circuit 300 to make clear that the input may be a component of or apart from the circuit 300 in different embodiments of the invention.

Accordingly, stochastic digital circuits operating in accordance with some of the principles described herein may operate to generate and output samples in accordance with a probability distribution based at least in part on random values, such outputs of the stochastic digital circuit are not certain and can be described in terms of probabilities. These samples are generated according to the probability distribution function with which the stochastic digital circuit is configured, and may be generated such that the proportion with which values are generated as samples roughly corresponds to the probability of the values occurring according to the probability distribution function.

Though stochastic circuit 300 may be constructed in any suitable way, the inventors have recognized that implementation of such a circuit may be feasible by assembling the circuit as an arrangement of stochastic subcircuits, which in turn may be constructed from an arrangement of one or more stochastic circuit elements. These subcircuits may be connected to each other or may be coupled through deterministic or other known logic elements.

By arranging a plurality of stochastic subcircuits and circuit elements together, each of which is producing samples from a probability distribution, a circuit may be formed that produces samples from a probability distribution related to all of these probability distributions. The relationship between the functions of the subcircuits and the interconnections between them may influence an overall probability distribution from which samples are generated for a stochastic circuit that includes stochastic subcircuits and circuit elements.

For example, a circuit may be constructed which produces samples according to a joint probability distribution based on the probability distributions of subcircuits, each of which implements a marginal probability distribution function. In this manner, it may be possible to construct circuits that produce samples from complicated probability distributions by arranging together circuits that produce samples from simple probability distributions.

Figure 3B:
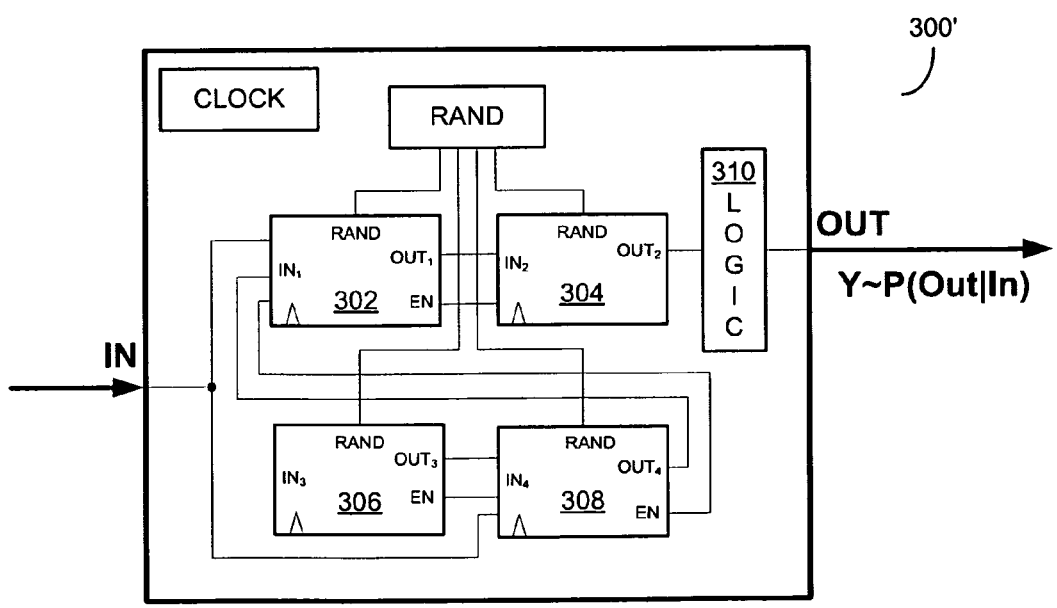
FIG. 3B is a block diagram of a stochastic circuit implemented from an interconnection of stochastic subcircuits.

A detailed discussion of the nature of these combinations and arrangements is provided below, including some examples of how stochastic subcircuits and stochastic circuit elements may be implemented. However, FIG. 3B shows, generally, an example of a stochastic circuit 300' that may be formed from a combination of stochastic subcircuits. In this example, the stochastic circuit 300' is shown comprising four different stochastic subcircuits 302, 304, 306, and 308. Each of these stochastic subcircuits may generate samples from conditional probability distributions as described above; for example, stochastic subcircuit 302 may produce samples from the probability distribution $P(OUT_1|IN_1)$. As shown, subcircuit 302 receives its input from the input values provided to the circuit 300' as well as an output (a sample) generated by the subcircuit 308. Accordingly, the output of a subcircuit 302 is a sample from the probability distribution $P(OUT_1|IN_1)$ as conditioned on those values as applied as inputs to the subcircuit.

Accordingly, it may be seen that, when arranged together, stochastic subcircuits may be constructed that are interdependent in that they may generate samples based on samples generated by other subcircuits. Though, it is not necessary that every stochastic subcircuit receive inputs from other subcircuits or even from values input to the overall stochastic circuit. In some cases—as mentioned above—a stochastic circuit may be implemented that does not accept any data input. Though such subcircuits may be implemented using the same techniques as those that implement conditional probability distributions, these subcircuits may produce samples from a probability distribution that is not a conditional probability distribution. Such a circuit is shown as subcircuit 306 in FIG. 3B.

When combining stochastic subcircuits in the manner shown in FIG. 3B, the subcircuits may be configured to produce samples synchronously; that is, each circuit may produce a sample at the same time or at an expected time. In other implementations, however, depending on the nature of the subcircuits, these circuits may produce samples at different times. This may be, for example, because the subcircuit 302 requires six steps or clock cycles to generate a sample, while the subcircuit 308 requires two steps/cycles to generate a sample. In some such implementations, the stochastic subcircuits may operate concurrently, though asynchronously.

To facilitate asynchronous operation, a stochastic subcircuit may also include a "done" or "enable" signal, such as the EN signal shown in FIG. 3B, that indicates that a sample has been produced and is ready to be consumed. The done/enable signal EN may be provided as an input to any component that is consuming samples from a stochastic subcircuit, including any of the stochastic subcircuits (e.g., the EN signal output by subcircuit 308 is provided as an input to subcircuit 302).

As mentioned above, the combination of stochastic subcircuits in the circuit 300' of FIG. 3B allows the circuit 300' to generate and output samples from a probability distribution that is based on these stochastic subcircuits. In the example of FIG. 3B, the circuit 300' produces samples from an overall probability distribution P(Out|In) that is based on, among other factors, P(Out$_1$|In$_1$). As shown in FIG. 3B, the subcircuit 304 may ultimately output samples that are samples from the overall probability distribution. The samples output by the circuit 304 may be subjected to any suitable processing in logic block 310, and output by the circuit 300' to be consumed in any suitable manner.

Circuits may be constructed and configured to carry out the design shown in FIG. 3A, and to act as subcircuits as shown in FIG. 3B, in any suitable manner, as embodiments of the invention that implement a stochastic digital circuit according to this design are not limited to any particular implementation. The specific construction of such a stochastic circuit may depend on the probability density function it is to implement. In some embodiments, each subcircuit may be constructed from stochastic circuit elements that generate samples according to a simple probability distribution.

Figures 4A, 4B:
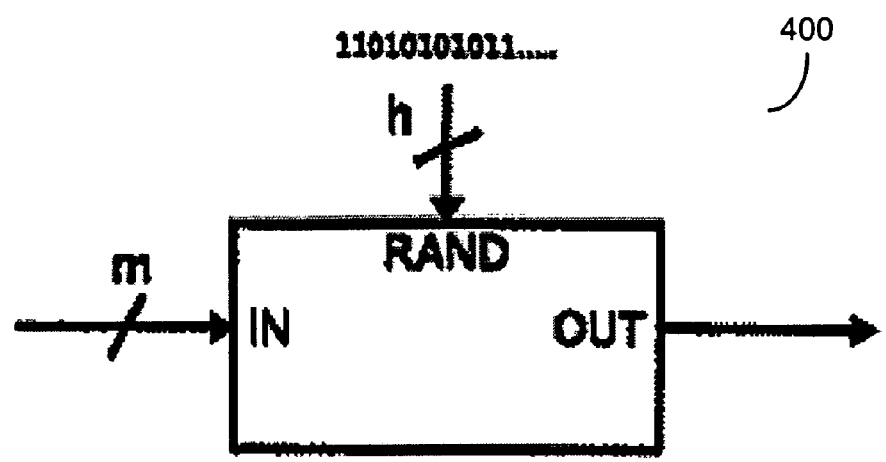
FIG. 4A is a block diagram of one possible stochastic circuit element that produces samples from a Bernoulli probability distribution.
FIG. 4B is a table showing a probability distribution of outputs of the stochastic circuit element shown in FIG. 4A.

FIG. 4A shows one way in which a stochastic circuit element that generates samples according to a simple conditional probability density function may be implemented. In this example, a circuit element 400 includes a random-bit input line (h bits wide) to receive a stream of random bits, and an input line (m bits wide) to input data. The circuit may operate according to a predefined conditional probability density function (pdf). For each cycle of operation, circuit element 400 may assert on its output line a sample generated in accordance with the pdf as conditioned by the value on the input line.

The probability distribution with which the stochastic circuit element 400 is configured may be associated with any suitable probability distribution. In some implementations, the circuit 400 may be configured to generate samples from a Bernoulli distribution configured by the inputs.

A Bernoulli distribution is a known probability distribution in which a first event (e.g., 1) occurs with probability p and a second event (e.g., 0) with probability 1-p. The Bernoulli distribution can be used to model many different problems for which the result may be one of two events, such as coin flipping (where the result is one of heads or tails). In a coin flipping example, the Bernoulli parameter p may be understood to be the likelihood that a coin will land heads. For a fair coin, the parameter p may be 0.5, because there is a 50/50 chance that a fair coin will land on its head. For an unfair coin, or many other systems in which the possible events are not equally likely, the parameter p may be something different from 0.5, such as 0.4 or 0.6.

The function of a stochastic circuit element configured to operate according to a Bernoulli distribution is represented by the conditional probability table illustrated in FIG. 4B. The table indicates the probability of possible output given each possible input. The first two rows of the table of FIG. 4B show the probabilities that a 0 or 1 will be output when the input is 0000. Though, all other rows of the table indicate that there are two possible outputs in response to each input, and a probability associated with each occurring. For example, the third and fourth rows indicate that, when the input is 0001, samples of the output should contain a value of 0 $^{15}/_{16}{}^{th}$ of the time, and a value of 1 $^{1}/_{16}{}^{th}$ of the time. Other inputs produce multiple possible outputs, each with a specified probability.

A stochastic circuit element operating according to the probability table of FIG. 4B may be implemented in any suitable way. As one example, the circuit element may be implemented as a lookup table that has multiple values associated with each input value. One of the multiple values may be selected based on the random bits input to the circuit element. By storing multiple values with the desired distribution, random selection based on the input yields the desired sample distribution. In the example of FIG. 4B, sixteen values may be stored in connection with the input 0001, fifteen of which are 0 and one of which is a 1. If four random bits are provided to select one of these values, the value 0 should be selected $^{15}/_{16}{}^{th}$ of the time, and 1 should be selected $^{1}/_{16}{}^{th}$ of the time, as desired.

Though, other implementations that may use less memory or circuitry may be used. As an example, when the samples are to be generated according to the Bernoulli distribution, circuit elements may be implemented as in FIG. 5A, 5B or 5C. These figures show three different ways in which a stochastic digital circuit may be implemented to generate samples from a Bernoulli distribution, but these are only illustrative examples of how a stochastic digital circuit may be implemented to generate samples from one illustrative probability distribution. Embodiments of the invention are not limited to generating samples in any particular manner from any particular distribution.

Figure 5A:
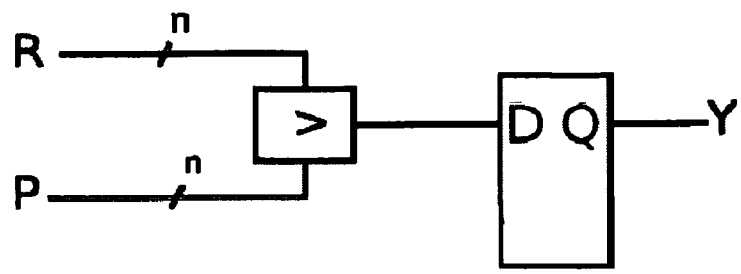
FIGS. 5A, 5B, and 5C are schematics three different possible digital implementations of a stochastic circuit element operating with a Bernoulli distribution.

FIG. 5A shows one way in which a stochastic digital circuit may be implemented to generate samples from a Bernoulli distribution. In the example of FIG. 5A, the circuit receives random bits R and an input signal, here identified p, that are each n-bits wide. The random bits R may come from a random bitstream of 1s and 0s, produced in any suitable manner. For example, the bitstream may be produced by any known pseudorandom number generator.

A random sample may be generated from the Bernoulli distribution by comparing the random bits R to the bits input on the input line p. This may be done, as shown in FIG. 5A, with a direct bit-wise comparison circuit element, shown as a "greater-than" gate. If the binary value of the random n bits of R is less than the value indicated by the n bits of p, then a 1 may be output. If, on the other hand, the binary value of the random n bits of R is greater than the value indicated by the n bits of p, then a 0 may be output. The output of the greater-than gate may be output to a memory element—shown in FIG. 5A as a D flip-flop—and output as the sample Y.

The circuit of FIG. 5A may generate a sample each time the D flip-flop is clocked. The signal clocking this flip-flop may be generated by a periodic clock which may operate synchronously with the clock for the source of random bit stream R. Though, the flip-flop may alternatively be clocked by an enable signal from other circuit element or other source generating values of the input p.

Regardless of how the flip-flop is clocked, for each operation, a new n bits are accepted as the random bits R and compared to the n bits of the input signal p. As illustrated in FIG. 3B, inputs may come from sources such as other stochastic subcircuits in a stochastic circuit or inputs to the stochastic circuit. In these cases, the input may be different each time the circuit element is enabled.

In some embodiments, the input signal p may be held constant between clock ticks. In this scenario, the input signal p may act as the Bernoulli parameter indicating the probability that a result will be the first Bernoulli state rather than the second Bernoulli state (e.g., 1 rather than 0). Thus, by changing the manner in which a circuit element is interconnected to other circuit elements, the function of that element may be specified.

FIG. 5A also illustrates that the circuit element includes an enable output, denoted EN. Here, the EN output has a fixed value of 1, indicating that a valid output is always present. Such an embodiment may be used, for example, if the circuit element of FIG. 5A generates a new value on every cycle of a system clock. In embodiments in which the circuit of FIG. 5A waits for input from other sources to operate or otherwise does not always have available at its output a valid value, the EN output may alternate between an enabled and a disabled state to indicate when a valid sample is present on the output line Y.

Figure 5B:
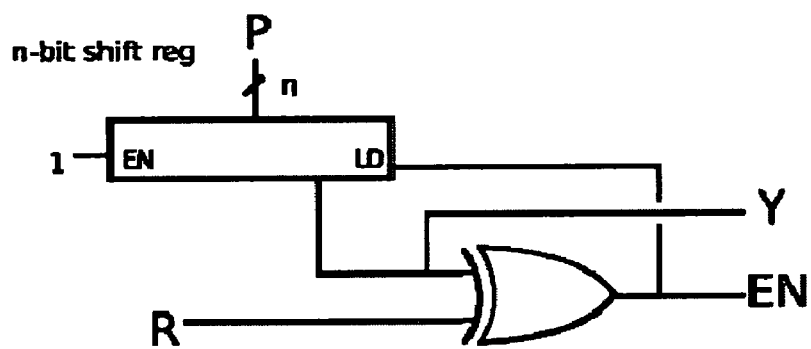

FIG. 5B shows another manner in which a stochastic digital circuit element may be implemented to generate samples from a Bernoulli distribution. In the implementation of FIG. 5B, a stochastic digital circuit may be implemented using a bit-serial comparator that takes as input an n-bit signal p as before and consumes a random signal R that is only one bit wide. The circuit of FIG. 5B uses a multiplexor to select incrementally a single bit from the input signal p—moving from least significant to most significant (i.e., right to left) similar to a shift register—and uses a standard AND gate to determine whether, at that time, the single bit input on the random signal R is equivalent to the currently-selected bit from p. If the two bits are equal, then the next bit is selected from p, and the multiplexor moves through the signal p from least significant to most significant, looping until a non-equivalence is found. When a non-equivalent value is found—that is, when the bit from R and the currently-selected bit from p do not match—then the AND gate asserts a false (logic low) value on the output line EN that instructs a component outside the circuit of FIG. 5B that a sample is being generated. The component receiving the EN output signal may then draw the value from Y as the sample output by the circuit, where Y is the value of the currently-selected bit from p.

When the EN signal has a logic low, a reset signal RST is used to reset the shift register back to the least significant (i.e., rightmost) bit of p. The circuit of FIG. 5B uses the bit-serial comparison operation to determine, for each sample generation cycle and for the bits examined so far in a cycle, whether the value formed by the examined bits of p or the value formed by the input bits from R is larger.

The effect of operation of the circuit of FIG. 5B is similar to the operation of the circuit of FIG. 5A, in that both perform a greater-than comparison on the two n-bit values, p and R, to determine which is larger. The circuit then produces a sample based on that comparison. However, where the circuit of FIG. 5A required two n-bit input lines and the circuitry to process those larger signals, the circuit of FIG. 5B can be smaller because its operations are only performed on a single-bit basis. Smaller size may be advantageous for environments where space may be a concern, or where a large number of stochastic digital circuits may be used together. Though, the circuit of FIG. 5B may require multiple clock cycles, as bits are shifted through the shift register, to produce a sample.

Figure 5C:
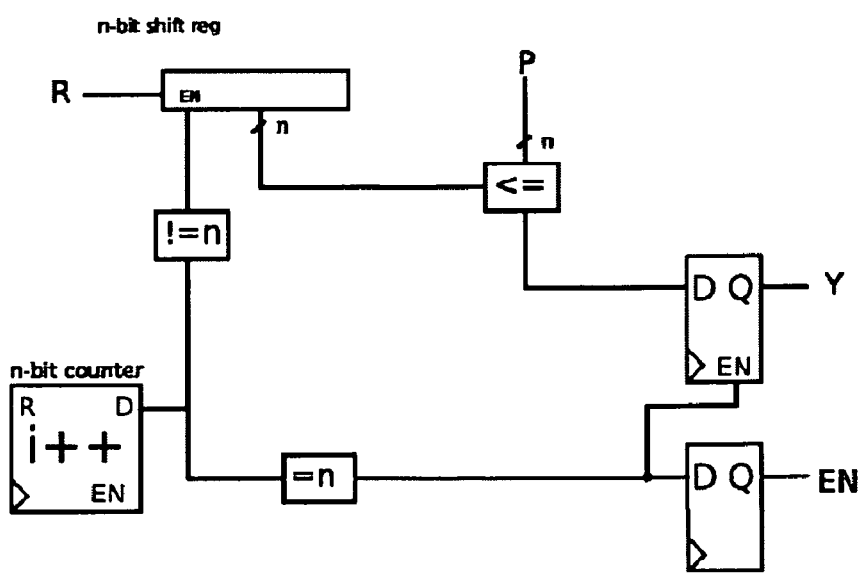

FIG. 5C shows a third manner in which a stochastic digital circuit may be implemented to generate samples from a Bernoulli distribution in some embodiments of the invention. Unlike the implementation of FIG. 5A, which can produce an output every time a clock signal ticks, the implementation of FIG. 5C only produces an output each n clock ticks, where n is the bit width of the input signal p. This is because while the circuit of FIG. 5C accepts as input p an n-bit wide signal, the circuit accepts as the source of randomness R only a single bit. Accordingly, the circuit of FIG. 5C includes an n-bit shift register that accepts as input one bit at a time and shifts another bit out each clock cycle. Every n clock cycles, then, all the bits in the n-bit shift register have been replaced.

The circuit of FIG. 5C includes a counter circuit to keep track of when n clock cycles have passed by, when a counter variable does not equal n, incrementing the counter variable. When the counter variable is detected to equal n (indicating n clock cycles have passed) then a D flip-flop may be provided input to indicate that the maximum has been reached and output a DONE signal as a reset indication. Additionally, the signal passed to the D flip-flop for the DONE signal may be passed as an "enable" signal to a D flip-flop for a sample output, indicating that the flip-flop should accept a new input from the less-than-or-equal-to gate that is comparing a current value in the n-bit shift register to p. Similar to the circuit of FIG. 5A, if the value of the n-bit shift register is less than or equal to p, then a 1 may be output by the gate and input to the D flip-flop, which may then output it as the sample Y. Conversely, if the value of the n-bit shift register is not less-than or equal-to p (i.e., is greater than) a 0 may be output as Y. Once a sample is output, the circuit may be reset, and a new sample generated n clock cycles later.

Three circuits for producing sample values according to a Bernoulli distribution have been described. It should be appreciated, however, that embodiments of the invention which produce samples from a Bernoulli distribution are not limited to being implemented in any specific manner, and as such are not limited to being implemented according to any of the circuit designs shown in FIGS. 5A, 5B, and 5C. Further, it should be appreciated that the Bernoulli distribution is only one exemplary probability distribution with which embodiments of the invention may operate. Stochastic digital circuits may produce samples from any suitable probability distribution. However, a conditional probability distribution of any complexity may be implemented as a combination of Bernoulli distributions. Thus, in some embodiments, stochastic circuits may be constructed form circuit elements that implement a Bernoulli distribution. Though, it should also be appreciated that stochastic circuit elements that implement any other probability distribution may similarly be combined into larger stochastic circuits.

As described above in connection, two or more stochastic circuits operating according to the techniques described herein may be combined in any suitable manner to form stochastic circuits that, overall, generate samples from probability distributions related to the probability distributions of the two or more stochastic circuits. For example, as shown in FIG. 3B, a stochastic circuit 300' may be implemented that produces samples from an overall probability distribution that is related to the probability distributions of stochastic subcircuits 302, 304, 306, and 308.

Figure 6A:
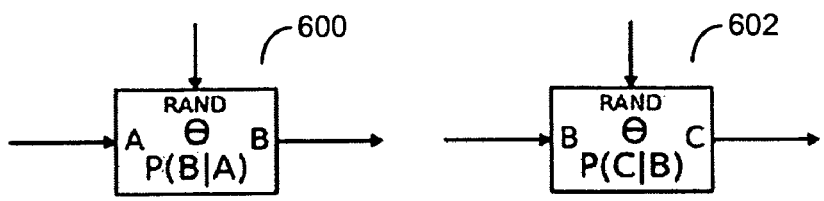
FIGS. 6A, 6B, and 6C are block diagrams of how two stochastic circuit elements can be interconnected to produce a stochastic subcircuit that produces samples from a joint distribution of both circuit elements.
Figure 6B:
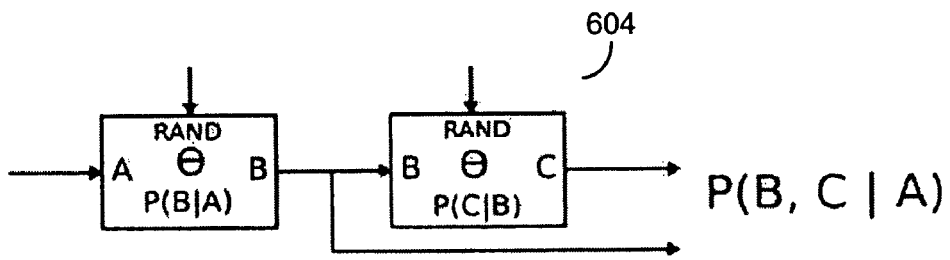

Stochastic subcircuits may be combined and arranged in any suitable manner to create stochastic circuits that generate samples from overall probability distributions that are related to the probability distributions of the stochastic subcircuits. These samples of the probability distributions FIG. 6A shows two stochastic subcircuits 600 and 602 that may be arranged to create a stochastic circuit. FIG. 6B shows one way in which the stochastic subcircuits may be combined to form a larger stochastic circuit. In FIG. 6B, the two stochastic circuits 600 and 602 are shown that respectively produce samples from the probability distributions P(B|A) and P(C|B), as discussed above. Each of these circuits is illustrated according to the implementation shown in FIG. 4A, but may be implemented in any suitable manner as any suitable circuit. For example, these circuits may be implemented as any of the exemplary Bernoulli circuits described above in connection with FIGS. 5A, 5B, and 5C.

FIG. 6B shows a stochastic circuit 604 formed by connecting the output B of circuit 600 to the input B of circuit 602. The circuit 604 may be considered a stochastic circuit that includes stochastic circuits 600 and 602, in that the stochastic circuit 604 produces samples from a new, third probability distribution that is produced by a combination of two probability distributions from stochastic circuit elements 600 and 602. By connecting the gates in the manner shown in circuit 604, the probability distribution of circuit 602 that was conditioned on its input B (i.e., P(C|B)) is now conditioned on the output of circuit 600.

Samples may be drawn from the circuit 604 in any suitable manner, and may be based on a desired distribution from which to sample. For example, by drawing samples both from circuit 600 and circuit 602, a sample may be drawn from the joint distribution of the overall probability distribution related to their individual probability distributions. For example, by drawing both a sample B and a sample C from the stochastic circuits 600 and 602, a sample B,C may be drawn from the joint probability distribution. As shown in FIG. 6B, when the overall probability distribution is conditioned on the input to circuit 604—namely, the input A—the sample from the joint distribution may be drawn according to the probability distribution P(B,C|A). This is the probability that the output B and the output C will be generated based on the input A.

Accordingly, in some implementations, it may be desirable to draw from a joint probability distributions formed by the combination of two or more stochastic circuits by drawing samples from each of the two or more stochastic circuits. In other implementations, however, it may be desirable to draw samples from a marginal distribution formed by the combination of the stochastic circuits. In the circuit 604 of FIG. 6B, samples generated by the circuit 600 are provided as input to the circuit 602; therefore, the probability distribution of the circuit 602 may be conditioned on these samples. When the probability distribution of circuit 602 is so conditioned, samples drawn from circuit 602 may be considered a sample drawn from the marginal distribution of the overall probability distribution (i.e., the marginal distribution of the joint distribution related to the individual probability distributions of circuits 600 and 602).

Figure 6C:
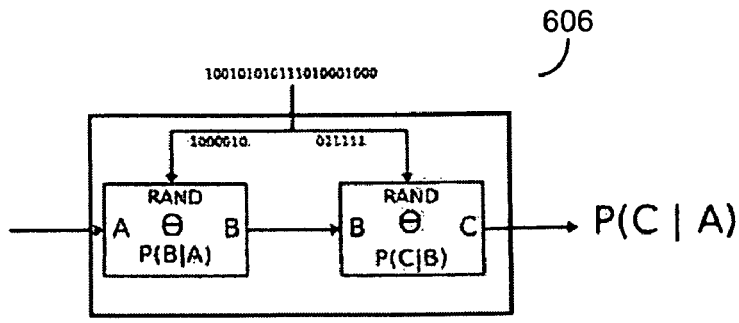

Further, because the output of circuit element 602 is conditioned on the sample value produced by circuit element 600, the probability distribution of the circuit element 602 may be thought of as the marginal distribution P(C|A), as indicated by the circuit 606 of FIG. 6C. Accordingly, stochastic circuits may be constructed that act in a manner similar to that shown in FIG. 4A—i.e., produce samples from a conditional probability distribution conditioned on an input, P(C|A)—by combining stochastic circuits and selecting one of the stochastic circuits as an output circuit.

In embodiments of the invention where multiple stochastic subcircuits are implemented in a stochastic circuit, a sample may be drawn from a marginal distribution in this manner (i.e., by outputting a sample from one of the stochastic subcircuits) or a sample may be drawn from a joint distribution by drawing samples from all stochastic subcircuits. Further, a joint marginal distribution may be sampled by drawing samples from two or more of the stochastic subcircuits in any suitable manner.

FIGS. 6B and 6C illustrate that stochastic circuits may be constructed by interconnecting two stochastic circuit elements or stochastic subcircuits, and conditional probability distributions may be created by the combination of stochastic subcircuits, where the created conditional probability distributions may be related to the individual probability distributions of the stochastic subcircuits (e.g., the joint probability distribution, marginal distribution, etc.). However, there is no limit on the number of stochastic circuit elements that may be combined into a subcircuit. Any suitable probability distribution may be formed in this manner by combining two or more stochastic digital circuit elements that produce samples from other probability distributions.

Figure 7A:
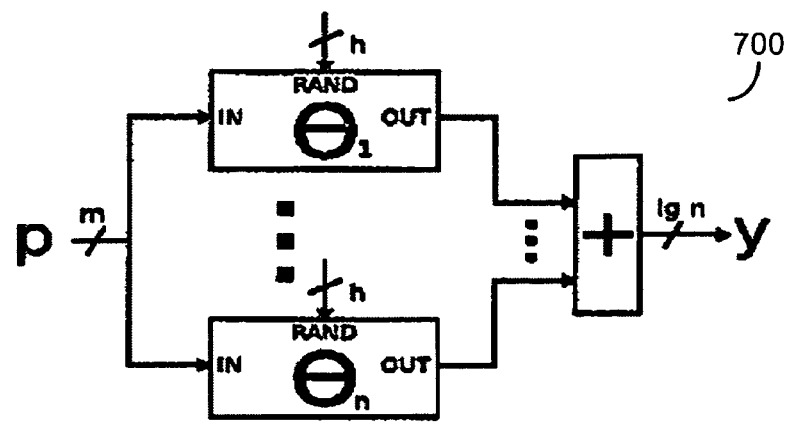
FIG. 7A is a block diagram of a stochastic subcircuit comprising both stochastic circuit elements and a deterministic adder that produces an output from a probability distribution defined by the operation of the elements and their interconnections.

Further, formation of subcircuits is not limited to interconnections of simple stochastic circuit elements. Stochastic subcircuits can be formed by the combination of stochastic circuit elements with deterministic circuit elements as well. FIG. 7A shows one such example, where a stochastic subcircuit 700 is formed by the combination of two or more stochastic circuit elements and a conventional deterministic adder (e.g., a circuit implementing a logarithmic adder tree). The stochastic subcircuit 700 may allow for the parallel generation of a number of samples from various probability distributions (e.g., the same or different) that may be combined to generate a sample from the probability distribution function formed by the combination of these stochastic circuit elements. For example, the subcircuit 700 may be one that produces samples from the known Binomial distribution. The Binomial distribution can be thought of as a distribution that characterizes n trials of a Bernoulli distribution.

As a simple example, if each of multiple coin tosses is one trial of a Bernoulli distribution based on a coin having weight p, the Binomial distribution may produce an answer to the question "How many heads will occur in n tosses of this coin with weight p?" Accordingly, each of the stochastic circuit elements of subcircuit 700 may be a stochastic digital circuit producing samples from a Bernoulli distribution conditioned on the input signal p, and there may be n circuit elements to correspond to the n samples used to generate the Binomial distribution. Each time the stochastic subcircuit 700 is enabled (which may be as frequently as one each cycle of a system clock), the n stochastic circuit elements will each produce a sample from the Bernoulli distribution, and these will be summed to provide the sample Y from the Binomial distribution. Accordingly, similar to the example of FIG. 6, the subcircuit 700 of FIG. 7A can be thought of as a stochastic subcircuit producing samples from the probability distribution P(Y|p), where this probability distribution is a Binomial distribution. This subcircuit can be combined with other stochastic subcircuits and other deterministic components to create a stochastic digital circuit according to even more complex probability distributions.

Figure 7B:
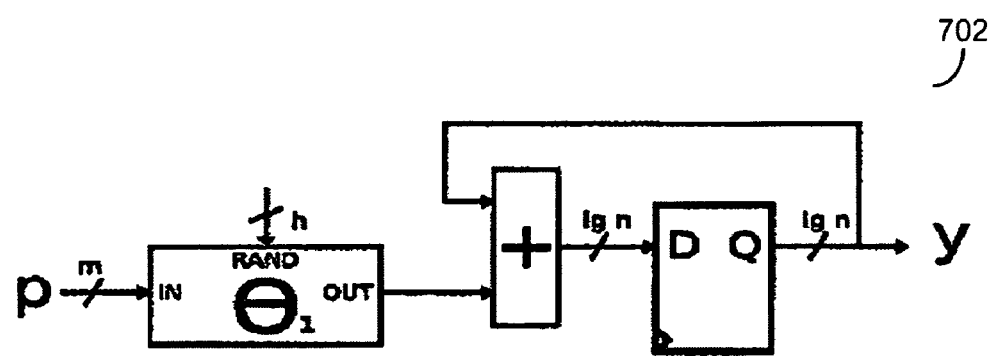
FIG. 7B is a block diagram of an alternative implementation of the stochastic subcircuit of FIG. 7A.

FIG. 7B shows another example of a stochastic subcircuit 702 that may be formed from a stochastic circuit element and deterministic components. The example of FIG. 7B, as the example of FIG. 7A, produces samples from a Binomial distribution but includes only one stochastic circuit element. In the example of FIG. 7A, the multiple circuit elements permitted the generation of a sample from the Binomial distribution on each clock cycle, whereas the subcircuit of FIG. 7B permits the generation of a sample from a Binomial distribution every n cycles. As in the example of FIG. 7A, the stochastic circuit element of FIG. 7B may produce samples from a Bernoulli distribution based on the input parameter p. The subcircuit 702 may operate to generate n samples from the Bernoulli stochastic element, and may use a deterministic adder circuit to combine these samples with previous samples. The adder may output a running total (e.g., for the coin flip example, a number of heads generated) to a deterministic memory element shown in FIG. 7B. While the sample is being generated, the memory element may output the current value (the running total) and feed it back into the adder circuit, and may output the sample itself as the total after n clock cycles. Though not shown in FIG. 7B, subcircuit 702 may include an enable output to indicate when computation of the new sample value is completed.

Just as with the subcircuit embodiment of FIG. 7A, the subcircuit 702 may be considered to be a stochastic digital circuit that generates samples from a Binomial distribution, and may also be viewed according to the convention of FIG.

4A as a single stochastic digital circuit producing samples from a Binomial distribution. This stochastic digital circuit may be used to generate samples from this distribution and/or may be combined with others to produce a larger stochastic digital circuit that produces samples from some other probability distribution.

FIGS. 7A and 7B illustrate that subcircuits may be constructed by interconnecting stochastic circuit elements to create new distribution functions. The nature of the interconnections may depend on the nature of the stochastic problem to be solved. However, Applicants have recognized and appreciated that there are certain design patterns that may occur frequently in constructing stochastic circuits. In some instances, the design patterns may be reflected in predefined subcircuits that may be selected to design a stochastic circuit to solve a particular problem.

In embodiments in which a stochastic circuit is to be implemented in an FPGA, ASIC or other semiconductor chip, these design patterns may be stored in computerized tools that aid in the design of such semiconductor chips. For example, a design pattern may be stored as a macro that defines interconnections of programmable logic elements within an FPGA in order to implement a particular stochastic function. Similarly, these design patterns can be represented as cores usable by ASIC design tools, similar to the way deterministic functional elements are represented as cores for ASIC design.

Figure 8A:
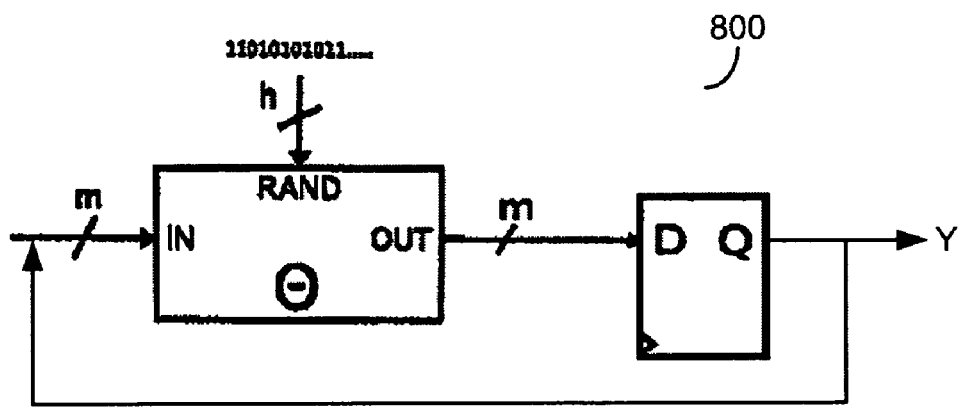
FIG. 8A is a block diagram of a stochastic subcircuit with stochastic circuit elements and deterministic circuit elements connected in a feedback loop to implement a stochastic finite state machine.

Any number or type of stochastic design elements may be defined. FIG. 8A provides an example of a design element that may be implemented as a stochastic subcircuit. Such subcircuits, as the subcircuits above, may be implemented as a combination of stochastic and deterministic circuit elements. In the subcircuit 800 of FIG. 8A, a stochastic circuit element is producing samples according to some probability distribution and is outputting these samples to a deterministic memory element. In the illustrated embodiment, the circuit element is producing samples according to the Bernoulli distribution as described above in connection with FIG. 4A. However, the invention is not limited to just Bernoulli stochastic circuit elements.

In the embodiment of FIG. 8A, the deterministic memory element is a D flip-flop. The flip-flop may output the samples each time they are generated and may pass these samples back to be fed into the stochastic circuit element as some or all of the input data IN. Accordingly, the subcircuit 800 forms a stochastic digital circuit that produces samples from a probability distribution that is dependent on a current state to determine the next state. Such a concept is shown in FIG. 8B, where the stochastic circuit element of the subcircuit 802 is shown as producing a sample according to the probability distribution P(S[t+1]|S[t])—or, in other terms, P(S[t]|S[t−1])—such that a new output is conditioned on the previous output.

Figure 8B:
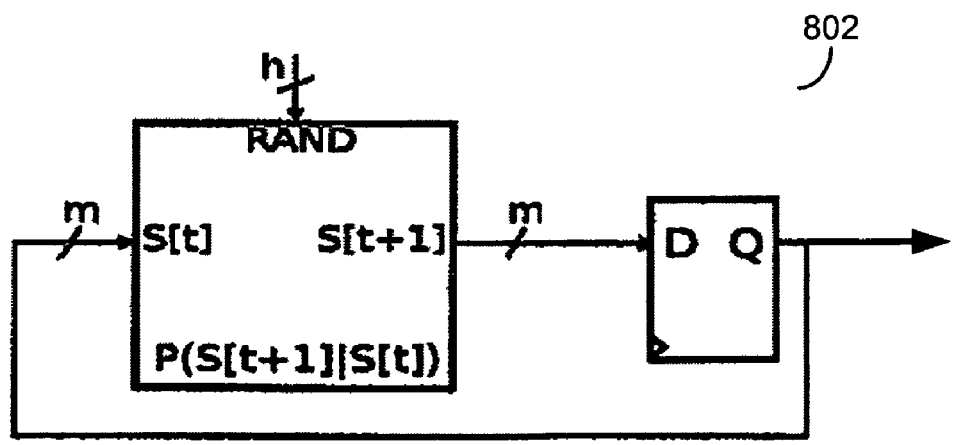
FIG. 8B is a block diagram of an alternative representation of a stochastic finite state machine that includes a feedback loop.

Implementing circuits that operate similar to those shown in FIGS. 8A and 8B, it is possible to implement finite state machines (FSMs) using stochastic digital circuits. Such stochastic FSMs are useful for solving a range of stochastic problems, including problems which are modeled according to some of the Markov Chain Monte Carlo (MCMC) algorithms described below. As described in more detail below, in some embodiments of the invention, a stochastic digital circuit may be implemented that operates on an MCMC transition kernel to determine a next state of a Markov chain, and that includes a memory element as shown in FIGS. 8A and 8B to store a current state of the chain.

Described below are examples of other design patterns that may be useful for implementing stochastic algorithms and produce samples to complex stochastic problems that may be modeled by these algorithms.

A wide range of stochastic sampling algorithms may be used to model a stochastic problem and may be used with the stochastic circuits described herein to solve these stochastic problems. These sampling algorithms generally fall into the class of Monte Carlo methods, which involve randomly drawing samples from a probability distribution and performing some deterministic computation on those samples to achieve a result. There are many different types of Monte Carlo methods, three examples of which described herein are rejection sampling algorithms, importance sampling algorithms, and a class of algorithms known as Markov Chain Monte Carlo (MCMC) algorithms. In some embodiments, design patterns for implementing one or more of these sampling algorithms may be identified and used to construct subcircuits, which are in turn connected to other components to implement a stochastic circuit.

Figure 9:
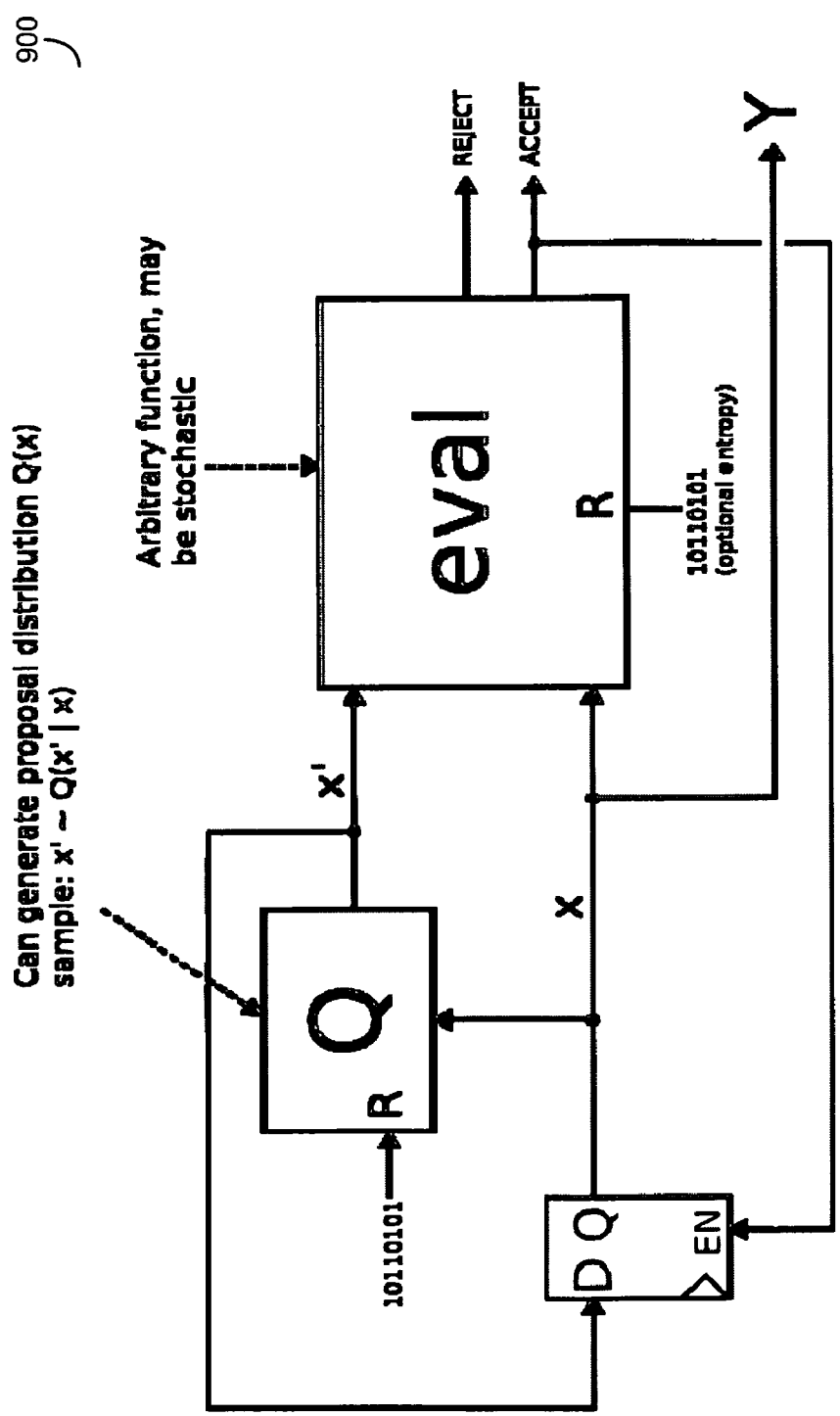
FIG. 9 is a high level block diagram of a circuit for implementing a stochastic sampling algorithm.

FIG. 9 shows a general overview of a stochastic circuit that may be used to implement stochastic sampling algorithms. As shown in FIG. 9, the circuit 900 includes a digital stochastic subcircuit that generates samples according to a proposed distribution Q(x), and may be conditioned on an input x such that a particular sample at output x' will be generated for a given value of input x according to the distribution P(x'|x). A digital stochastic subcircuit implementing this probability distribution may take as input the value x, as well as a random bitstream R.

In some implementations of the circuit 900, the sample output according to Q(x) may be an acceptable sample and may be used as the sample output by the circuit 900. In other implementations, however, the sample x' may be evaluated according to some function to determine whether the sample x' is an acceptable sample. As shown in FIG. 9, the value x', upon being generated, is provided to an EVAL circuit to determine whether the sample is acceptable. The EVAL circuit may carry out any suitable process, such as a deterministic or stochastic process, to determine whether the sample is acceptable, and may use stochastic and/or deterministic circuit elements in performing this process. This process may be based on the particular sampling algorithm that is being implemented. If the process is stochastic, then the EVAL circuit may take as input another random bitstream R.

The EVAL circuit may produce either an ACCEPT signal or a REJECT signal indicating whether the sample x' will be accepted as a sample. If the sample x' will be accepted, then the circuit 900 may output this value as the output Y. As shown in FIG. 9, the output Y may be taken from a memory element that stores the value x' when the ACCEPT signal is asserted. This memory element may also allow the value x' to be provided as feedback to the stochastic circuit element operating according to Q(x), in cases where the stochastic algorithm being implemented is one in which a next output depends on a previous output.

The circuit 900 of FIG. 9 may characterize an overall flow of some algorithms that may be implemented using the principles described herein, but does not characterize all algorithms. Examples are given below of a manner in which particular algorithms may be implemented using stochastic digital circuits; some of these circuits may operate according to the design of FIG. 9. It should be appreciated, however, that embodiments of the invention are not limited to implementing stochastic sampling algorithms in any particular manner, and that any suitable implementation may be used based on the problem to be solved.

Also, FIG. 9 does not expressly illustrate an enable signal to indicate when a sample has been generated. It is to be understood that subcircuits to be interconnected with other circuits may provide such signals so that other subcircuits receiving values generated by the subcircuit can operate only on valid values. In the embodiment of FIG. 9, the ACCEPT output provides an indication that a valid sample has been generated and therefore may be used to generate an enable output.

Figure 10:
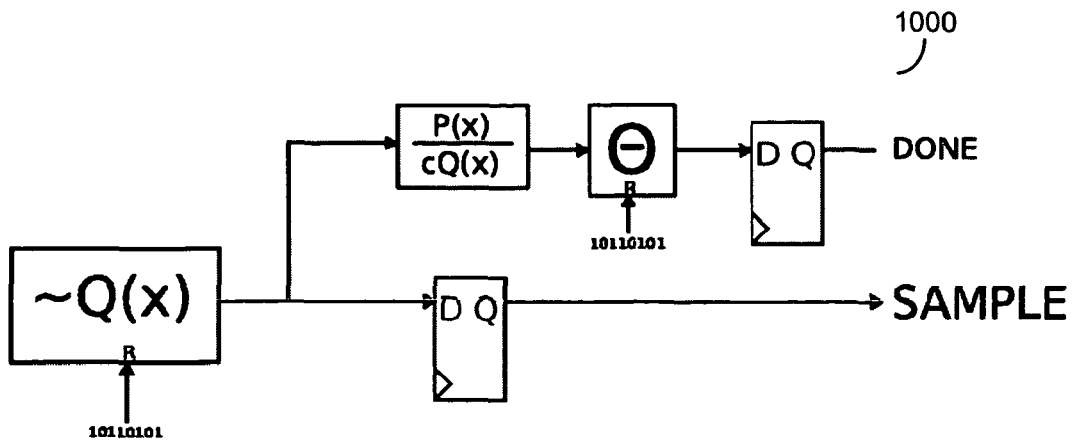
FIG. 10 is a block diagram of an exemplary circuit that may be used to carry out a rejection sampling algorithm.

FIG. 10 shows an example of how stochastic digital circuits described herein may be used to implement a rejection sampling algorithm. Rejection sampling in general is known in the art, and is generally used where directly sampling a desired probability distribution $p(x)$ is difficult or impossible, but sampling a closely-related probability distribution $Q(x)$ that includes the desired probability distribution—such that $p(x) < cQ(x)$, where c is a constant—may be relatively easy.

As shown in circuit 1000 of FIG. 10, a stochastic digital circuit may be implemented to produce samples from the closely-related probability distribution $Q(x)$. This circuit may produce samples as described above, and may be implemented by combining stochastic and/or deterministic circuit elements according to the techniques described above. Though, any suitable implementation may be used.

Samples according to the probability distribution $Q(x)$ may be output to a memory element, here shown as a D flip-flop. The samples may also be output to an arithmetic unit that carries out the division function $p(x)/cQ(x)$ for the generated sample that is used to determine whether the sample generated from the probability distribution $Q(x)$ is likely to be within the desired probability distribution $p(x)$—if the sample is not within the desired probability distribution it is rejected. The output of this mathematical unit (i.e., whether the sample is accepted or rejected) is passed through a stochastic circuit element sampling from a Bernoulli distribution, such that there is a likelihood that the sample will be accepted or rejected. If the output of the Bernoulli circuit indicates that the sample is to be accepted, then the DONE output line may be asserted to indicate to an outside component that a sample is ready to be read on the SAMPLE output line.

Conversely, if the sample is not accepted, circuit 1000 may perform another iteration to generate another sample and determine whether it is to be accepted or rejected. Iterations may be repeated until the memory element holds a sample that is accepted.

Figure 11:
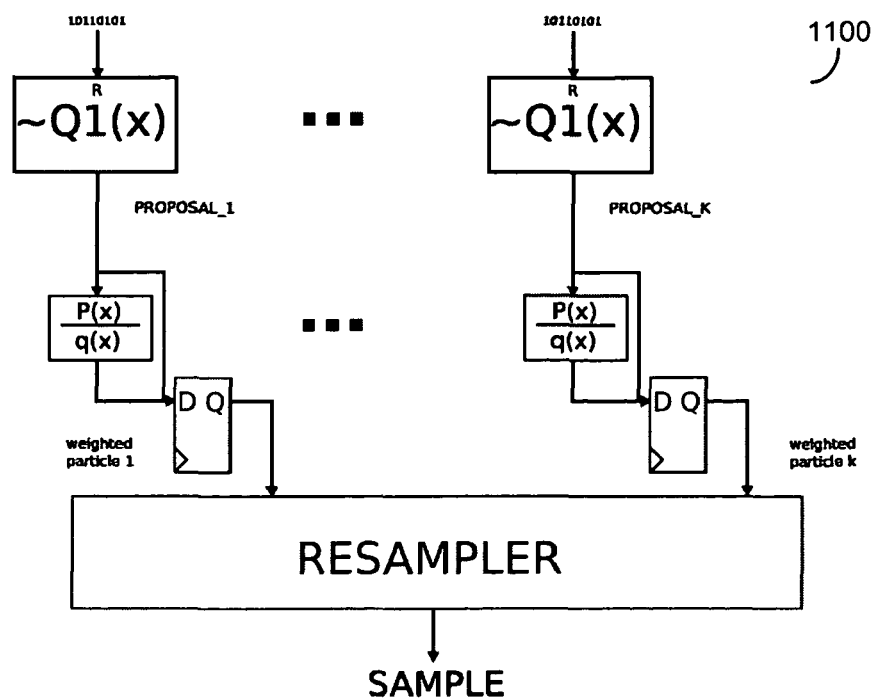
FIG. 11 is a block diagram of an exemplary circuit that may be used to carry out an importance sampling algorithm.

FIG. 11 shows another exemplary circuit design pattern for another class of known sampling algorithms. In this example, the circuit implements an importance sampler. As in rejection sampling, in importance sampling values are sampled from a probability distribution that approximates a desired probability distribution, $p(x)$, such as in the case where the desired probability distribution is difficult to calculate. Using importance sampling, a probability distribution $q(x)$ may proposed that is thought to be a good approximation of $p(x)$, and k samples may be generated from stochastic digital circuits that implement this proposed distribution. Various proposals for a sample, known as "particles," may be produced from each of these stochastic digital circuits, and these particles may be weighted by the ratio between the proposed distribution $q(x)$ and the desired distribution $p(x)$. A resampling process is then performed on the weighted particles and one is selected to be output as a sample. A particle may be selected in rough proportion to its weight.

FIG. 11 shows an implementation of a stochastic circuit that may implement importance sampling. As shown, multiple stochastic subcircuits generate in parallel samples according to a proposed distribution $Q(x)$. As shown, multiple stochastic subcircuits can each generate samples according to the proposed distribution $Q(x)$, such that multiple samples are generated in parallel from the probability distributions $Q_1(x) \ldots Q_k(x)$.

The output of each subcircuit, representing a proposed sample, may be weighted using a digital arithmetic circuit that can multiple the sample value by a scale factor represented as a ratio of the probability that the sample value will be generated in accordance with the desired probability distribution relative to the probability that the sample value will be generated using the proposed probability distribution used to generated the proposed sample.

These weighted values may be latched in memory elements, here implemented as a set of D flip-flops. Once each of the subcircuits $Q_1(x) \ldots Q_k(x)$ generates a sample, a resampler circuit may select one of those values as the sample output. The resampler circuit may be either a deterministic circuit or may itself be a further stochastic subcircuit, depending on the overall probability distribution to be implemented by the circuit 1100.

Figure 12:
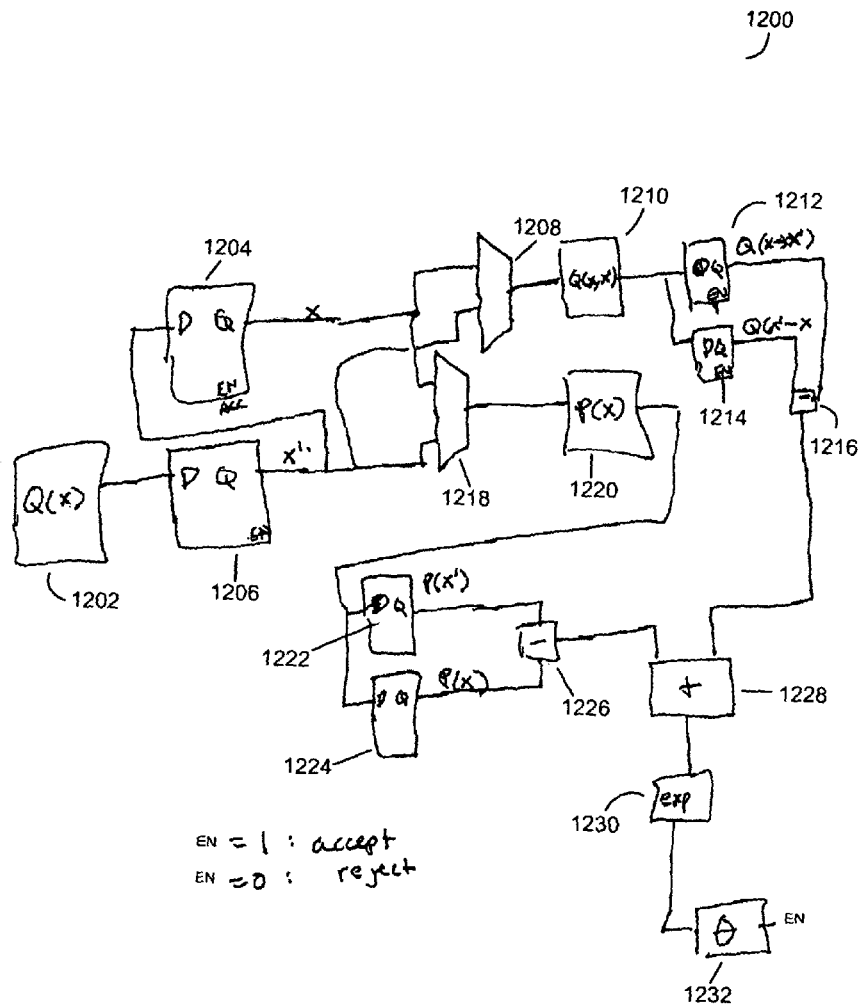
FIG. 12 is a block diagram of an exemplary circuit that may be used to carry out a Metropolis-Hastings sampling algorithm.

Another design pattern that may recur in solving stochastic problems is a subcircuit that implements the Metropolis-Hastings (MH) algorithm for sampling. FIG. 12 shows one exemplary implementation of a circuit that generates samples according to the Metropolis-Hastings (MH) algorithm. The MH algorithm is a Markov Chain Monte Carlo (MCMC) algorithm that may be used to produce samples from a probability distribution that is difficult or impossible to sample exactly by creating a Markov chain of samples from a proposed distribution through a biased random walk process and evaluating the samples to determine whether they are samples from the desired probability distribution. In a Markov chain, a next state of the chain is dependent only on a current state, and not on past states. A random walk algorithm may be one in which a number of possible state values (e.g., potential samples) are determined as well as the probability of each of the values being generated as a sample after another sample is generated—in other words, for each state associated with a value, the likelihood that the process will walk to or "jump" to that state from the other states.

The Metropolis-Hastings algorithm therefore, on each iteration, generates a sample and determines whether that sample was likely to be generated based on the previously-generated sample for both the proposed distribution and the desired distribution. If so, the newly-generated sample may be "accepted" and output as a sample; otherwise, the sample is rejected, the previously-generated sample is again output as a sample, and the process repeats to generate a new sample. In this way, the Metropolis-Hastings algorithm may be considered to be one fitting the generic form shown in FIG. 9, wherein a sample is generated and some function is performed to determine whether that sample is acceptable.

FIG. 12 shows one implementation of the Metropolis-Hastings algorithm using the stochastic circuits described herein. In each iteration, a sample is generated from a proposed probability distribution $Q(x)$ that is a model of some other desired probability distribution $P(x)$ that is a distribution of interest. Element 1202 of FIG. 12 is a stochastic circuit element that produces samples from the distribution $Q(x)$. It should be appreciated that the distribution $Q(x)$ may be conditioned on various input data; in particular, in some implementations the distribution $Q(x)$ for a first iteration n may be conditioned on a sample generated in a previous iteration n−1, such that to generate a sample x' in a first iteration is conditioned on the sample x generated in a previous distribution (i.e., the probability distribution is $Q(x'|x)$).

When a sample x' is generated from stochastic circuit 1202, it may be provided to the storage element 1206 for storage. In this iteration, then, storage element 1206 stores x' and storage element 1204 stores x. These values may be provided, one at a time, to a element 1220 that performs a mathematical, deterministic operation on both x and x' to determine the probability that each of these would be generated based on a probability distribution P(x). Element 1220 performs this operation twice, with element 1218 acting as a multiplexor to provide each of x and x' to the operation, respectively. In the operation performed by element 1220, the values of samples x and x' may be subjected to a logarithmic operation to convert them to the log domain. This may be done because, when working with probabilities, the values will likely be between 0 and 1, and possibly very small and close to zero; converting them to the log domain has the effect of making these numbers larger and enables simpler arithmetic to be performed (e.g., multiplication becomes addition, and division becomes subtraction). The probability that x would be generated is stored in a storage element 1222, and the probability that x' would be generated is stored in a storage element 1226. Element 1226 performs a subtraction operation on the operations (in the log domain), such that it outputs (in the real domain) a ratio of the probability that x' will be generated to the probability that x will be generated: P(x')/P(x).

A ratio of probabilities is also calculated for the Q(x) distribution. Element 1210 is a deterministic element that performs two operations. First, it computes, using the probability density function for Q(x), the likelihood that x' would be produced based on x. For this first operation it accepts on a first input x' and accepts on a second input x, and evaluates the pdf for Q(x') using x as a given (i.e., produces a sample from the marginal distribution for x). This value is output to storage element 1212 and stored. Second, the element 1210 performs the same operation with the values reversed; in other words, it evaluates the pdf for Q(x) using x' as a given. This value is then output to storage element 1214.

These two probabilities stored in elements 1212 and 1214 are then subtracted (in log space) by mathematical element 1216, to yield the ratio between these two probabilities: Q(x'|x)/Q(x|x').

The ratios calculated by elements 1226 and 1216 are the two terms of the Metropolis-Hastings algorithm. The likelihood that a sample will be accepted is defined for this algorithm as $a=a_1 a_2$, where $a_1=P(x')/P(x)$ and $a_2=Q(x'|x)/Q(x|x')$. Accordingly, in block 1228 these two ratios—still in the log space—are summed in adder element 1228 to provide the probability a. Once calculated, the output of adder 1228 is provided to a mathematical element 1230 to perform an exponential operation on the value, to convert it back to a real value and remove it from the log domain.

The value output by element 1230 is the likelihood that a sample will be accepted as a sample during this iteration of the Metropolis-Hastings algorithm. In block 1232, this probability is provided to a stochastic circuit 1232, which operates to produce samples from a Bernoulli distribution conditioned on this probability. The stochastic circuit 1232 produces an output value EN indicating whether the sample has been accepted.

If the sample is accepted, then the sample x' is output and consumed in any suitable manner. Further, this sample x' may be provided as an input to stochastic circuit 1202 such that the probability distribution of the stochastic circuit is conditioned on the newly-generated sample.

If the sample is rejected, then the previous sample x is again output as a sample, and the previous sample x may again be provided to element 1202 to condition the probability distribution on this value.

Regardless of whether the sample is accepted, once the EN sample is generated the process may be repeated, and another sample may be generated by the stochastic circuit 1202.

Various advantages are offered by performing a Metropolis-Hastings algorithm using the stochastic circuit 1200 shown in FIG. 12. For example, the Metropolis-Hastings algorithm may be perform exceptionally well when implemented with a Q(x) that is a symmetric distribution; for example, the Gaussian distribution. When such a distribution is used, the ratio Q(x'|x)/Q(x|x')—the ratio that is calculated in circuit 1200 by elements 1208, 1210, 1212, 1214, and 1216—may be 1, as there is a uniform likelihood that x will be "jumped to" given x' and that x' will be jumped to given x. However, conventional implementations do not allow for the use of Gaussian distributions, because using Gaussian distributions samples with conventional techniques requires generating a great many samples from probability distributions before acceptable samples may be generated. This may be done because a symmetric, Gaussian distribution may not produce the diversity of samples that other distributions may produce, and thus when using a Gaussian distribution it may be necessary to produce more samples to gain more information about the desired probability distribution P(x). Generating many samples requires a great deal of time and, further, with conventional implementations generating each sample may take a great deal of time. Accordingly, conventional implementations typically cannot implement Metropolis-Hastings using Gaussian distributions, because of prohibitive time costs.

Using stochastic circuits as described herein, however, that natively act to produce samples from probability distributions, samples may be generated quickly from many distributions, including the Gaussian distribution. A great many samples may therefore be generated quickly, far faster than may be generated using conventional techniques. Because of this, it is possible to implement a Metropolis-Hastings algorithm using a proposed distribution Q(x) that is a Gaussian distribution, and accordingly a circuit may be implemented for carrying out the Metropolis-Hastings algorithm that does not need to calculate the ratio Q(x'|x)/Q(x|x'); it may always be 1. A stochastic circuit implementing the Metropolis-Hastings algorithm and operating according to techniques described herein, then, may be made smaller and faster by the elimination of these components and their related operations.

It should be appreciated that the circuit 1200 of FIG. 12 is only one exemplary manner of implementing a Metropolis-Hastings algorithm using circuits operating according to the techniques described herein, and that others are possible. Further, stochastic circuits may implement any suitable sampling technique in any suitable manner. For example, the Metropolis-Hastings algorithm and other MCMC algorithms may be implemented according to the teachings of any the following references, which are incorporated by reference herein in their for their discussion of techniques for implementing stochastic sampling algorithms and other techniques for solving stochastic problems, as well as its teachings regarding stochastic processes:

Metropolis, N., Rosenbluth, A., Rosenbluth, R., Teller, A. & Teller, E. (1953). *Equation of state calculations by fast computing machines*. J. Chem. Phys.

Andrieu, C. and De Freitas, N. and Doucet, A. and Jordan, M. I. *An introduction to MCMC for machine learning*. Machine Learning vol 50, pages 5-43. 2003.

Neal, R. M. *Probabilistic inference using Markov chain Monte Carlo methods*. Department of Computer Science, University of Toronto. 1993.

Geman and Geman (1984). *Stochastic Relaxation, Gibbs Distributions, and the Bayesian Restoration of Images*. IEEE Transactions on Pattern Analysis and Machine Intelligence 6: 721-741.

MacKay, D. J. C. *Information theory, inference and learning algorithms*. Cambridge University Press. 2003.

M. F. Tappen and W. T. Freeman. *Comparison of Graph Cuts with Belief Propagation for Stereo, using Identical MRF Parameters*. In Proceedings of the Ninth IEEE International Conference on Computer Vision (ICCV), Pages 900-907, 2003

The Geman and Geman reference above describes the use of Gibbs sampling algorithms (a special case of the MH algorithm) for use in image analysis, and describes implementing Gibbs algorithms in connection with Markov Random Fields (MRFs). Some of the advantages offered by implementing stochastic sampling algorithms according to the techniques described herein, and using the stochastic digital circuits described herein, may be illustrated well when these techniques and circuits implement a Gibbs sampling algorithm for MRFs. Gibbs/MRF algorithms are generally considered to be conceptually simple, but computationally are very inefficient. However, when implemented using the techniques described herein, multiple Gibbs kernels may be implemented as stochastic subcircuits and at least a subset of those subcircuits may be operated in parallel at any given time to provide very fast and efficient solutions to Gibbs/MRF algorithms.

Figure 13A:
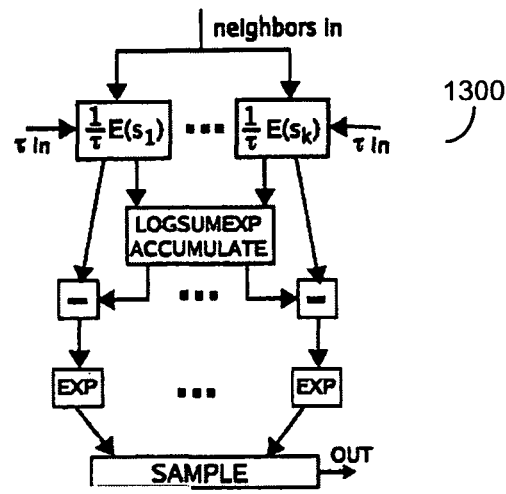

FIGS. 13A to 13D show one implementation of a Gibbs/MRF algorithm that may use stochastic digital circuits as described herein. FIGS. 13A and 13B show alternative implementations of a Gibbs kernel that may form a subcircuit in a stochastic circuit implementing a Gibbs/MRF algorithm. Each Gibbs kernel may operate individually, but may provide output to and accept input from its neighboring kernels.

Gibbs sampling algorithms are useful for modeling stochastic problems that include many random variables $X_1, X_2, \ldots, X_n$ that are difficult to evaluate independently. Gibbs sampling assists in the modeling of the stochastic problem by assigning a particular value to all but one of the random variables, and then producing a sample from the conditional distribution for the remaining variable based on those other random variables. The probability distribution by which a Gibbs kernel may operate for a random variable $X_1$ may therefore be characterized as $P(X_1|X_2, X_3, \ldots, X_n)$. A sample for $X_1$ produced according to this distribution may be provided to another Gibbs kernel to perform computation for another random variable according to a similar distribution, such as $P(X_2|X_1, X_3, \ldots, X_n)$.

As shown in FIG. 13A, a Gibbs kernel 1300 for a particular random variable may perform a process that includes calculating a score for each possible event given input values provided by neighboring kernels. This scoring may be done by using a joint probability density function describing the MRF with which the Gibbs kernel 1300 is working, and calculating the conditional probability for the variable on which Gibbs kernel 1300 is operating. Once these scores are computed, they may be tempered, and a (log) normalizing constant may be computed and used to normalize the energies. These normalized energies may then be converted to probabilities for each of the possible events, and a sample may be generated based on those samples. This process can be implemented for a Gibbs kernel 1300 in linear time based on the size of the random variable with which the Gibbs kernel 1300 is operating, and can be implemented using standard techniques combined with a simple stochastic accumulator for sampling.

The Gibbs kernel of FIG. 13A provides many improvements over conventional techniques because it provides for quickly calculating and producing outputs, and may be implemented in parallel. However, even greater efficiency may be achieved when the conditional probability table (CPT) for a sample is small—in other words, when the number of potential inputs and outputs is small and a probability of each event occurring (i.e., each output being generated) given a set of inputs can be easily computed. In this case, these probabilities can be used to precompute weights, which are entered into a lookup table stored in memory in a stochastic subcircuit, such that when inputs are received from neighboring kernels the set of possible inputs and the appropriate weighted values may be determined in constant time by accessing them in the lookup table. Such an implementation may be useful when the degree of required randomness for a stochastic problem is not very high and the degree of the MRF is not very large.

As shown in FIG. 13B, when inputs $n_1 \ldots n_m$ are received by the Gibbs kernel 1302, the Gibbs lookup table retrieves the precomputed weights and provides them on the DOUT line to a stochastic circuit element that selects an output such that the probability distribution $P(X_1|X_2, X_3, \ldots, X_n)$ is implemented. This stochastic circuit element (labeled Theta) receives the weights on its input line WEIGHT and receives a source of randomness (such as a randomly generated bit stream) on the random signal line ENTROPY. The stochastic circuit element then produces a sample from the distribution on its output line DOUT, conditioned on the input weights, which is output by the Gibbs kernel 1302 on its output line DOUT. In this manner, a Gibbs kernel may be implemented in a very fast manner, and may allow for implementing a Gibbs/MRF sampling algorithm very efficiently.

As mentioned above, in a Gibbs sampling algorithm a number of random variables are being operated on, and a conditional probability distribution may be computed for each. Accordingly, a Gibbs kernel, which may be implemented in the manner shown in one of FIGS. 13A and 13B, may be used for each of the random variables in the stochastic problem. Each kernel associated with a random variable $X_i$ may receive as inputs values from other Gibbs kernels associated with other random variables on which the random variable $X_i$ depends. Each Gibbs kernel may be configured to sample according to the conditional probability distribution for the random variable $X_i$ given the values of the other random variables. As a result, the overall Gibbs sampling problem may be represented as a graph of interconnected kernels.

Greater efficiency may be achieved using these Gibbs kernels by exploiting conditional independencies in the Markov Random Field (MRF) of the stochastic problem. Specifically, when an MRF graph is colored such that no two adjacent nodes have the same color, all nodes of the same color are conditionally independent of each other given all other colors, and thus can be sampled in parallel. This was first observed in the Geman and Geman reference provided above for square-lattice MRFs, such as the one shown in FIG. 13C. When coloring an MRF, the degree of parallelism depends inversely on the number of colors, and the communication cost between Gibbs kernels is determined by the total bits crossing coloring boundaries in the MRF.

Figure 13D:
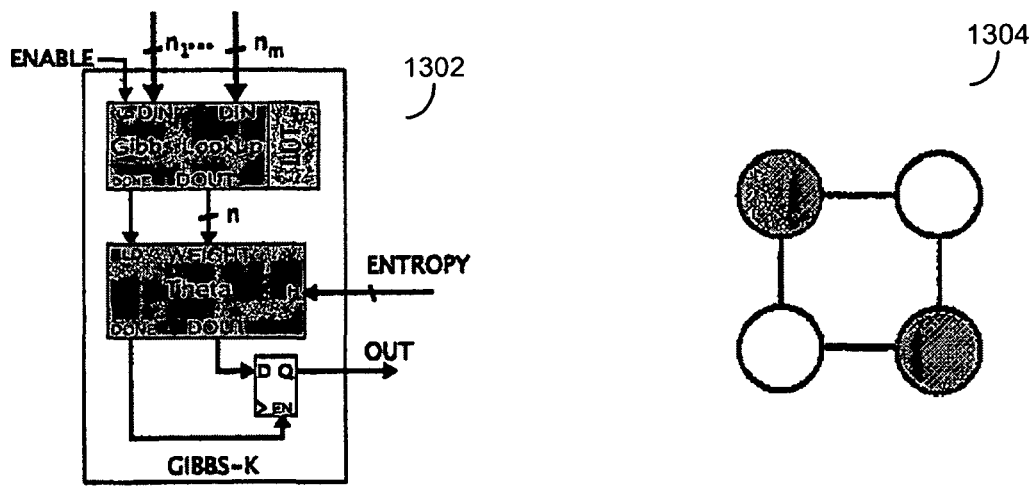
Figure 13D:
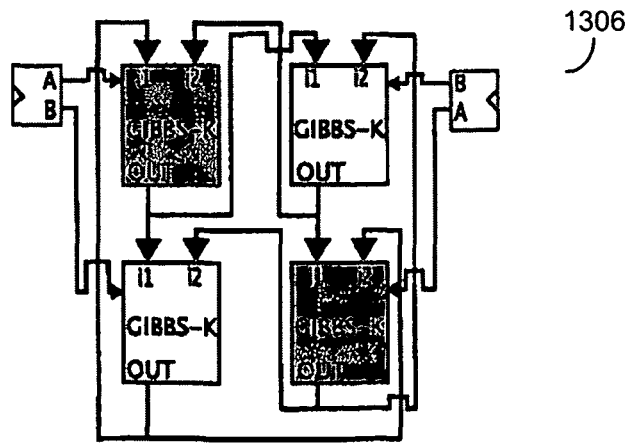

FIG. 13D shows an implementation of a stochastic circuit operating according to the Gibbs/MRF sampling algorithm that exploits that parallelism that may be achieved when a stochastic problem has the MRF shown in FIG. 13C. As shown, there are two "colors" of Gibbs kernel, light and dark. Kernels, such as those illustrated in FIG. 13B, may be interconnected as shown. The light kernels may be operated in parallel, and the dark kernels may be implemented in parallel, because it can be seen that their operations do not depend directly on values output by each other. In other words, as shown the outputs of the dark kernels are connected to the inputs of the light kernels, and the outputs of the light kernels are connected to the inputs of the dark kernels. The dark kernels are not connected to each other, and the light kernels are not connected to each other, thus they may be operated in parallel. Accordingly, the stochastic circuit 1306 of FIG. 13D is a two-phase structure of a parallel cycle of single site Gibbs kernels. For very large models—larger than the one shown in FIGS. 13C and 13D—this pattern can be tiled arbitrarily, using any number of phases. The kernels associated with each "color" may be operated in parallel, preserving constant time Gibbs scans independent of lattice size at linear space cost in lattice area.

Figure 14:
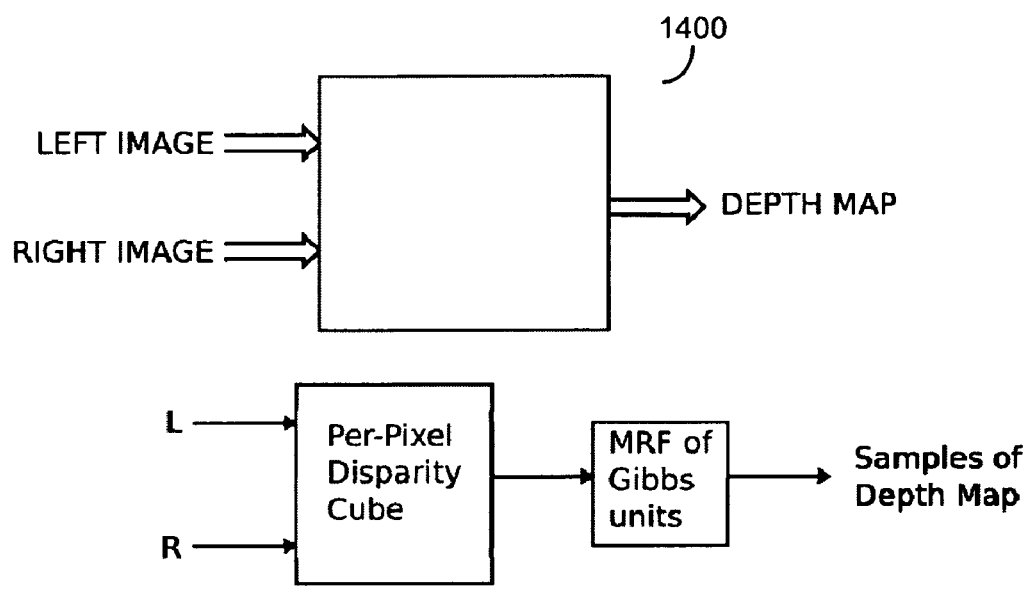
FIG. 14 is a block diagram of an exemplary stochastic accelerator that may be implemented for providing potential solutions to image processing problems and that may be implemented using the stochastic digital circuits of FIGS. 13A, 13B, 13C, and 13D.

This implementation of the Gibbs sampling algorithm using MRFs may be useful for solving a variety of stochastic problems. For example, some stereo vision problems may be solved efficiently using this implementation. FIG. 14 shows an example of how the Gibbs sampler may be used in performing a stereo vision problem.

As shown in FIG. 14, two images may be generated in a stereovision problem, such as a right image and a left image from two digital cameras. The digital information created by the digital cameras may be inputs to a stochastic circuit that is configured to perform a Gibbs sampling algorithm as described above. This stochastic circuit may generate and output samples from a depth map, that are samples from a probability distribution for a particular object that are potential "answers" for a distance to a particular object observed by the left and right images. This may be done by inputting the left and right images to a per-pixel disparity cube for analysis and outputting the results of this analysis to an array of Gibbs kernels implemented similar to the manner shown in FIG. 13D. This lattice of Gibbs kernels may then produce a sample from the Gibbs kernels.

Several sampling algorithms have been described and exemplary implementations of stochastic circuits have been shown. It should be appreciated, however, that embodiments of the invention are not limited to implementing any particular stochastic sampling algorithm—or any sampling algorithm—and may implement algorithms in any suitable manner.

Other stochastic sampling algorithms that may be implemented in embodiments of the invention include the Chinese Restaurant Process and other algorithms for solving clustering problems. For example, an efficient Gibbs sampling algorithm for Bayesian clustering may be implemented using Chinese Restaurant Process mixture models, as a special case of a more general Gibbs sampling algorithm for relational clustering. This algorithm is implementable in stochastic circuitry using the stochastic digital circuits described herein by constructing a stochastic finite state machine that uses traditional memory architectures to store the data and sufficient statistics and Gibbs kernels to serially evaluate and sample form cluster assignments for each datapoint. Such an algorithm is known in the art, and may be implemented using stochastic circuits in any suitable manner.

As another example, Gibbs sampling algorithms may also be used for text analysis using topic models. Such algorithms are implementable in stochastic circuitry by constructing a stochastic finite state machine that uses traditional memory architectures to store the text corpus and sufficient statistics and Gibbs kernels to serially evaluate and sample from topic assignments for each word. Such algorithms are known in the art, and may be understood from a 2004 publication by Griffiths, T. L., & Steyvers, M., entitled *Finding scientific topics*, available in the Proceedings of the National Academy of Sciences, volume 101, pages 5228-5235, and a 2007 publication by Steyvers, M. & Griffiths, T., entitled *Probabilistic topic models*, printed in the Handbook of Latent Semantic Analysis published by Erlbaum. These articles are hereby incorporated herein by reference in their entirety, at least for their discussion of Gibbs sampling algorithms that may be used for text analysis and other techniques for solving stochastic problems, as well as its teachings regarding stochastic processes.

Further, Markov Random Fields (MRFs) were described above as being useful for performing sampling algorithms in accordance with Gibbs sampling algorithms. It should be appreciated, though, that Markov Random Fields may be useful for solving stochastic problems using a wide range of sampling algorithms, and not only Gibbs sampling.

The techniques described herein for generating samples from a probability distribution that models a stochastic process may be implemented in any suitable manner in any suitable computing environment. As described above, in some cases stochastic digital circuits may be implemented as a stochastic processor that operates to produce samples from probability distributions which either are the solutions to a stochastic problem or are used in solving a stochastic problem. In some cases, these stochastic processors may be implemented as co-processors with deterministic processors.

Figure 15:
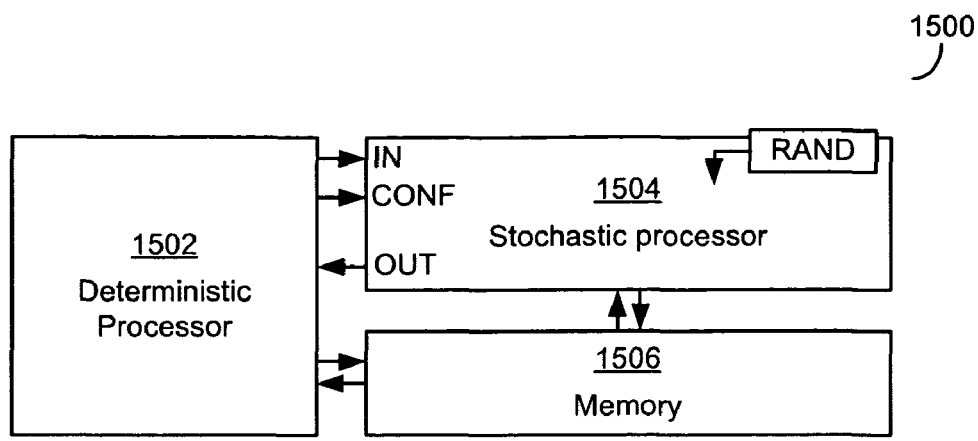
FIG. 15 is a block diagram of a computing device including both deterministic computing elements and stochastic computing elements.

Such a computing environment 1500 is shown in FIG. 15, in which a deterministic processor 1502 and a stochastic processor 1504 are implemented as co-processors. These co-processors 1502 and 1504 may share some resources of a computing environment, such as memory 1506. The stochastic processor may receive inputs from the deterministic processor 1502 and then produce one or more values on the output line OUT. These values may be samples in accordance with a probability distribution for which the co-processor 1504 is configured to generate samples. Such a configuration may be useful when the probability distribution approximates the solution of a deterministic problem or generates typical values of parameters on which deterministic processor 1502 is programmed to operate. The samples may also be useful if deterministic processor 1502 is programmed to compute probabilities of certain event based on samples and make decisions based on the computed probabilities.

Though, processing may be partitioned between deterministic processor 1502 and stochastic processor 1504 in any suitable way. For example, the probability distribution function defining the samples generated by stochastic processor 1504 may generate samples of values that may otherwise occur at any stage in deterministic processing.

In some embodiments, stochastic processor 1504 may be implemented in a programmable circuit. The programming of stochastic processor 1504 may be changed to solve any desired problem. The programming, for example, may specify the probability distributions according to which one or more stochastic circuit elements operate and the manner in which those circuit elements are interconnected. In some embodiments, this programming may be specified at the time stochastic processor 1504 is manufactured. Though, in other embodiments, this programming may be specified dynamically in the computing environment such as FIG. 15. As shown in FIG. 15, a deterministic processor 1502 may be adapted to provide input (CONF) to a stochastic processor 1504 that may configure the stochastic processor 1504 to solve a particular stochastic problem as well as input (IN) upon which the stochastic processor may act.

The computing environment 1500 may be used in any suitable manner to carry out any suitable computing task. For example, if the computing environment 1500 is implemented in a robot, the deterministic processor 1502 may be carrying out deterministic decisions and may be, for example, generating control signals that control the movement components of the robot so that the robot moves through a field of objects. The deterministic processor 1502 may configure the stochastic processor 1504 to carry out a stereovision problem, and may provide as input to the stochastic processor 1504 information from cameras that are serving as the robots eyes. The stochastic processor 1504 may be adapted to generate samples indicative of a distance of an object observed by the cameras, and provide these samples as output on the output line OUT. The deterministic processor 1502 may then review these samples, and make decisions regarding how to control or instruct the movement components; for example, if the samples indicate that an object is in the path of the robot and the robot is in danger of striking the object, the deterministic processor 1502 may control the movement components to change the robots speed and/or direction to avoid striking the object.

The ability to configure a stochastic processor may be useful in scenarios other than the one illustrated in FIG. 15. In some embodiments of the invention, the above-described design principles can be leveraged to create reconfigurable stochastic digital circuits by providing stochastic and deterministic circuit elements with reconfigurable connections between them. For example, a set of stochastic circuit elements may be provided that each produces samples from various probability distributions—such as Bernoulli distributions, Binomial distributions, exponential distributions, and others. These stochastic circuit elements may be programmable, to provide the desired configuration to each of these (e.g., the p parameter for Bernoulli circuits, n for Binomial circuits, etc. may be programmable). Deterministic circuit elements, such as adders and memory elements, may also be provided in a reconfigurable component. Some or all of these circuit elements may then be connected to one another according to configuration commands, which may be in the form of electronic input signals, pulses of light that alter interconnections in the component or other circuit programming techniques. Regardless of how achieved, the programming may form a stochastic digital circuit that produces samples according to a desired probability distribution which is related to a stochastic problem. In this way, a reconfigurable stochastic digital circuit may be configured and used in the solution of various stochastic problems.

In some implementations, a great deal of flexibility may be offered for a reconfigurable circuit by providing a large number of Bernoulli stochastic digital circuits in a reconfigurable component. This may be done because many stochastic problems can be thought of as complex Bernoulli problems. For example, as discussed above, a stochastic problem modeled by the Binomial distribution may be thought of as multiple interrelated Bernoulli problems. Other stochastic problems may be similarly simplified to Bernoulli problems, and as such probability distributions associated with these stochastic problems may be thought of as complex combinations of Bernoulli distributions. Accordingly, a reconfigurable stochastic component as described above may be provided with a large array of Bernoulli circuits (i.e., circuits that produce samples according to a Bernoulli distribution, such as the circuits of FIGS. 5A, 5B, and 5C), with configurable interconnects that may make connections between the Bernoulli circuit elements. Deterministic circuit elements, including memory elements, also may be included to allow formation of any desired probability distribution.

Though, it should be appreciated that the a reconfigurable stochastic component could have an array or arrays of stochastic circuit elements of any desired form or forms that can be joined through a configurable interconnect. Such circuits alternatively or additionally may include one or more subcircuits that implement design patterns as described above. These components, in conjunction with memory and other deterministic elements that may be included in the component, may be configured to implement a desired stochastic processor.

Though, it should be appreciated that a reconfigurable stochastic component need not be implemented with an array of stochastic elements at all. As described above, stochastic circuit elements may be implemented using digital logic design techniques. Thus, conventional programmable components for digital logic design may be configured to implement stochastic circuits as described above.

Figure 16:
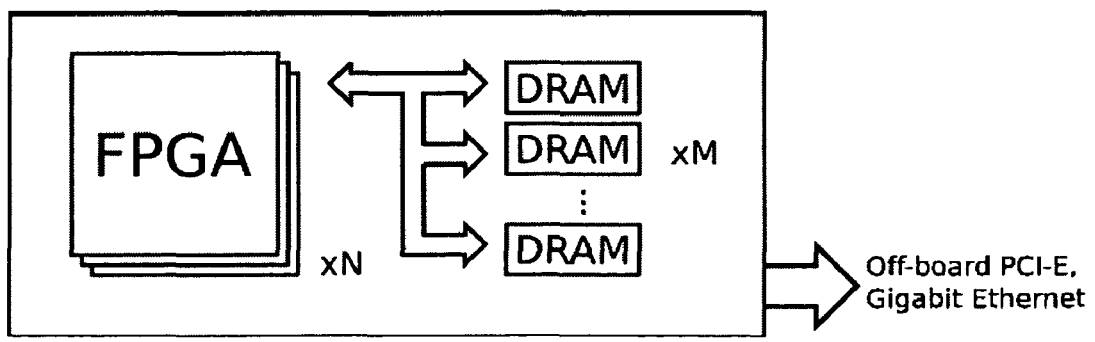
FIG. 16 is a block diagram of a Field-Programmable Gate Array (FPGA) that may be used to implement stochastic circuits as described herein.

For example, a stochastic processor, such as the stochastic processor 1504, or any other stochastic digital circuit may be implemented in a Field-Programmable Gate Array (FPGA) as is known in the art. An FPGA implementation is shown in FIG. 16, which includes a plurality of FPGAs and a plurality of storage components (shown as DRAM memory elements in FIG. 16). The FPGAs can be configured to produce samples from a probability distribution of interest in any suitable manner, such as by configuring the FPGAs to act as any of the exemplary circuits described above or as circuits acting according to the techniques described herein. An FPGA may be configured by programming the FPGA to connect various circuit elements together to form larger circuits that perform stochastic and/or deterministic functions, and by specifying values to be stored in look-up tables that may be used in calculating solutions to stochastic problems. As shown in FIG. 16, the FPGAs may be adapted to output data in any suitable fashion, such as via a Peripheral Component Interconnect Express (PCI-E) connection to another computing device, via an Ethernet connection, or in any other suitable manner.

It should be appreciated that the co-processor implementation of FIG. 15 and the FPGA implementation of FIG. 16 are merely illustrative, and embodiments of the invention are not limited to implementing stochastic digital circuits in any particular manner or according to any particular technique. In alternative implementations, stochastic digital circuits may be implemented as Application Specific Integrated Circuits (ASICs), and may be configurable to solve a variety of different stochastic problems or hard-wired to solve a specific stochastic problem.

Techniques have been described above for implementing stochastic digital circuits that produce samples according to a probability distribution. According to these techniques, circuit elements may be designed to produce samples according to a distribution, and these circuit elements may be combined with others, in accordance with a programming of a reconfigurable circuit, to produce samples to other distributions. Any type of probability distribution may be constructed and sampled using these techniques. Producing samples from probability distributions in this way can be helpful in providing solutions to stochastic problems. Additional details on these techniques and their theory of operation may be found in *Stochastic Digital Circuits for Probabilistic Inference* by Vikash K. Mansinghka, Eric M. Jonas, and Joshua B. Tenenbaum, published as the Massachusetts Institute of Technology Computer Science and Artificial Intelligence Laboratory Technical Report No. MIT-CSAIL-TR-2008-069 (2008), which is incorporated by reference herein in its entirety at least for its discussion of theory, processes, techniques, and algorithms for creating and operating stochastic circuitry. Circuits may be implemented according to the theory, processes, techniques, and algorithms described herein, as well as according to any of the theory, processes, techniques, and algorithms described in the above referenced technical report.

Embodiments of the invention have been described where the techniques are implemented in circuitry and/or computer-executable instructions. It should be appreciated that the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

Having thus described several aspects of at least one embodiment of this invention, it is to be appreciated that various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. An apparatus comprising:
    zero or more input terminals;
    at least one output terminal from which is output samples from an overall conditional probability distribution conditioned on input received on the zero or more input terminals; and
    a plurality of stochastic subcircuits, each including zero or more input subterminals and at least one output subterminal, wherein each of the plurality of stochastic subcircuits is configured to produce from its at least one output subterminal samples from a conditional probability distribution conditioned on input received on the zero or more input subterminals,
    wherein the plurality of stochastic subcircuits are interconnected to form a stochastic circuit that produces samples from the overall conditional probability distribution, and wherein each of the plurality of stochastic subcircuits generates the samples based at least in part on the conditional probability distribution and a source of randomness.

2. The apparatus of claim 1, wherein the overall probability distribution is a joint probability distribution based on the conditional probability distributions of the plurality of stochastic subcircuits.

3. The apparatus of claim 2, wherein samples generated by each of the plurality of stochastic subcircuits is output on the at least one output terminal to generate a sample from the joint probability distribution.

4. The apparatus of claim 2, wherein samples generated by a subset of the plurality of stochastic subcircuits is output on the at least one output terminal to generate a sample from a marginal probability distribution of the joint probability distribution.

5. The apparatus of claim 1, wherein one of the plurality of stochastic subcircuits is an output subcircuit that generates samples from the overall probability distribution, and the output subcircuit is coupled to the at least one output terminal to output the samples.

6. The apparatus of claim 5, wherein the samples generated by the output subcircuit are generated from a marginal distribution of the overall probability distribution, the marginal distribution being the conditional probability distribution of the output subcircuit conditioned on a sample generated by at least one other stochastic subcircuit.

7. The apparatus of claim 6, wherein a second of the plurality of stochastic subcircuits is a second output subcircuit that generates samples from the overall probability distribution, and the second output subcircuit is coupled to the at least one output terminal to output the samples,
    wherein the samples output by the output subcircuit and the samples output by the second output subcircuit are samples from a marginal probability distribution of the overall probability distribution.

8. The apparatus of claim 5, wherein the output subcircuit is directly coupled to the at least one output terminal.

9. The apparatus of claim 5, wherein the output subcircuit is coupled to a deterministic evaluation circuit performing at least one evaluation operation to determine whether a sample generated by the output subcircuit is an acceptable sample, and
    wherein only samples determined to be acceptable samples are output on the at least one output terminal.

10. The apparatus of claim 1, wherein input data received on at least one of the zero or more input terminals is provided to a first stochastic subcircuit such that the conditional probability distribution of the first stochastic subcircuit is conditioned on the input data.

11. The apparatus of claim 1, wherein no input data is received and the overall conditional probability distribution is conditioned on nothing.

12. The apparatus of claim 1, wherein the apparatus includes no input terminals.

13. The apparatus of claim 1, wherein an output subterminal of a first stochastic subcircuit is coupled to an input subterminal of a second stochastic subcircuit.

14. The apparatus of claim 13, wherein the second stochastic subcircuit generates samples according to a marginal distribution of a joint probability distribution based on the probability distributions of the first and second stochastic subcircuits.

15. The apparatus of claim 13, wherein a connection is made between the first stochastic subcircuit and the second stochastic subcircuit based at least in part on configuration data received by the zero or more input terminals.

16. The apparatus of claim 1, wherein the plurality of stochastic subcircuits are interconnected by at least one deterministic circuit element.

17. The apparatus of claim 16, wherein the at least one deterministic circuit element includes a deterministic adder circuit.

18. The apparatus of claim 17, wherein the deterministic adder circuit is a logarithmic adder circuit.

19. The apparatus of claim 16, wherein the at least one deterministic circuit element includes a memory element.

20. The apparatus of claim 19, wherein a combination of a stochastic subcircuit and the memory element forms a stochastic finite state machine.

21. The apparatus of claim 19, wherein the memory element is coupled to an output of a first stochastic subcircuit to store a sample generated by the stochastic subcircuit, and a value of the sample stored by the memory element is fed back to the stochastic subcircuit.

22. The apparatus of claim 1, wherein a first stochastic subcircuit comprises:
a plurality of stochastic circuit elements, wherein each of the stochastic circuit elements comprises:
zero or more element input terminals, and
at least one element output terminal,
wherein each of the stochastic circuit elements generates samples from a conditional probability subdistribution conditioned on input received on the zero or more element input terminals, each sample being generated based on the conditional probability subdistribution and on a source of randomness,
wherein the conditional probability distribution of the first stochastic circuit is a joint distribution based on the plurality of conditional probability subdistributions, and
wherein the plurality of stochastic circuit elements are interconnected to form the first stochastic subcircuit that produces samples from a marginal distribution of the joint distribution.

23. The apparatus of claim 22, wherein the conditional probability distribution of the first stochastic subcircuit is a Binomial distribution.

24. The apparatus of claim 23, wherein each of the plurality of stochastic circuit elements produces samples from a Bernoulli distribution.

25. The apparatus of claim 24, wherein the plurality of stochastic circuit elements are connected in parallel to a deterministic adder circuit that performs a sum operation on samples generated by each of the plurality of stochastic circuit elements to determine a sum.

26. The apparatus of claim 25, wherein the sum is output as a sample of the Binomial distribution of the first stochastic circuit.

27. The apparatus of claim 23, wherein the zero or more input subterminals of the first stochastic circuit include a first input line specifying a number of stochastic circuit elements to be included in the first stochastic subcircuit and a second input line specifying a probability of success.

28. The apparatus of claim 27, wherein the number of stochastic circuit elements is an n parameter of a Binomial distribution, and the probability of success is a p parameter of a Binomial distribution, and the Binomial distribution is conditioned by the n and p parameters.

29. The apparatus of claim 23, wherein upon receipt of a value on the first input line, a number of stochastic circuit elements equal to the value are selected and interconnected to form a Binomial distribution, and each of the stochastic circuit elements is configured with a value received on the second input line to generate samples according to a Bernoulli distribution parameterized with the value.

30. The apparatus of claim 22, wherein each of the stochastic circuit elements includes a first element input terminal to receive a value specifying a likelihood of success for a Bernoulli probability distribution, and each of the stochastic circuit elements is configured to generate a sample from a probability distribution conditioned on the value.

31. The apparatus of claim 30, wherein the first stochastic subcircuit further comprises a plurality of deterministic circuit elements, and wherein the plurality of stochastic circuit elements and the plurality of deterministic circuit elements may be interconnected to form a desired probability distribution based on a configuration input.

32. The apparatus of claim 31, wherein the plurality of stochastic circuit elements and the plurality of deterministic circuit elements are interconnected to form a Gaussian distribution.

33. The apparatus of claim 1, further comprising:
processing components to receive samples generated from the overall distribution circuit and perform at least one post-sampling processing action on the samples.

34. The apparatus of claim 33, wherein the at least one post-sampling processing action comprises aggregating samples and calculating probabilities, based on the samples, that particular values will be generated as samples.

35. The apparatus of claim 34, wherein the probability calculated by the processing components are output from the apparatus.

36. The apparatus of claim 1, wherein the source of randomness is a pseudo-random number generator.

37. The apparatus of claim 36, wherein each of the plurality of stochastic subcircuits receives an individual value from the pseudo-random number generator.

38. The apparatus of claim 36, wherein each of the plurality of stochastic subcircuits is connected to a different pseudo-random number generator.

39. The apparatus of claim 1, wherein the plurality of stochastic subcircuits are configured to implement a stochastic sampling algorithm.

40. The apparatus of claim 39, wherein the stochastic sampling algorithm is a Monte Carlo sampling algorithm.

41. The apparatus of claim 39, wherein the stochastic sampling algorithm is a rejection sampling algorithm.

42. The apparatus of claim 39, wherein the stochastic sampling algorithm is an importance sampling algorithm.

43. The apparatus of claim 39, wherein the stochastic sampling algorithm is a Markov Chain Monte Carlo (MCMC) algorithm.

44. The apparatus of claim 43, wherein the MCMC algorithm is a Metropolis-Hastings algorithm.

45. The apparatus of claim 43, wherein the MCMC algorithm is a Gibbs sampling algorithm.

46. The apparatus of claim 45, wherein the Gibbs sampling algorithm is for a Chinese Restaurant Process mixture model.

47. The apparatus of claim 46, wherein each of the plurality of stochastic subcircuits implements a Gibbs transition kernel.

48. The apparatus of claim 39, wherein each of the plurality of stochastic subcircuits is associated with a node of a Markov Random Field (MRF).

49. The apparatus of claim 48, wherein interdependent nodes of the MRF are interconnected by connecting an output line of a first stochastic subcircuit for a first node with an input line of a second stochastic subcircuit for a second node, and connecting an output line of the second stochastic subcircuit with an input line of the first stochastic subcircuit.

50. The apparatus of claim 48, wherein stochastic subcircuits that are associated with independent nodes of the MRF are concurrently operated to produce samples in parallel.

51. The apparatus of claim 50, wherein the stochastic circuit is operated to produce data useful for solving an image analysis problem.

52. The apparatus of claim 50, wherein the stochastic circuit is operated to produce data useful for solving a tomography problem.

53. The apparatus of claim 50, wherein the stochastic circuit is operated to produce data useful for solving a stereovision problem.

54. The apparatus of claim 50, wherein each of the stochastic subcircuits implements a Gibbs transition kernel.

55. The apparatus of one of claims 47 and 54, wherein each stochastic subcircuit includes a memory element storing a precomputed conditional probability table by which potential samples are selected according to inputs received on the zero or more input subterminals.

56. The apparatus of claim 1, wherein the stochastic circuit is adapted to produce samples that are indicative of events relating to a stochastic problem.

57. The apparatus of claim 56, wherein the stochastic problem is an image analysis problem.

58. The apparatus of claim 57, wherein the stochastic problem is a stereovision problem and the zero or more input lines receive data related to two or more images, and wherein samples generated by the stochastic circuit are indicative of a possible distance to an object observed in the two or more images.

59. The apparatus of claim 56, wherein the stochastic problem is a text analysis problem and the zero or more input lines receive data related to text to be analyzed.

60. The apparatus of claim 59, wherein the text analysis problem is determining a topic of a text document, and the samples generated by the stochastic circuit are indicative of a possible topic of the document.

61. The apparatus of claim 60, wherein the stochastic circuit implements a Gibbs sampling algorithm for Latent Dirichlet Allocation models for topic analysis.

62. The apparatus of claim 56, wherein the stochastic problem is a causal diagnosis problem.

63. The apparatus of claim 56, wherein the stochastic problem is a tomography problem.

64. The apparatus of claim 56, wherein the stochastic problem is an object tracking problem using sequential importance sampling with resampling.

65. The apparatus of claim 1, wherein the stochastic circuit is implemented in a Field-Programmable Gate Array.

66. The apparatus of claim 1, wherein the stochastic circuit is implemented in an Application-Specific Integrated Circuit (ASIC).

67. The apparatus of claim 66, wherein the ASIC is adapted to produce samples that are indicative of events relating to a specific stochastic problem.

68. The apparatus of claim 66, wherein the ASIC is reconfigurable to produce samples indicative of events relating to a plurality of stochastic problems.

69. The apparatus of claim 1, wherein the stochastic circuit is implemented as a stochastic processor accepting input relating to a stochastic problem and/or a scenario and generating samples according to the overall probability distribution associated with the stochastic problem.

70. The apparatus of claim 69, wherein the stochastic processor is implemented as a co-processor in a computing environment including at least one deterministic processor.

71. An apparatus comprising:
a stochastic circuit including zero or more input terminals and at least one output terminal, wherein the at least one stochastic circuit produces on the at least one output line samples from a conditional probability distribution conditioned on input data provided on the zero or more input terminals,
wherein generation of the samples is based at least in part on the conditional probability distribution and on a source of randomness.

72. The apparatus of claim 71, wherein the source of randomness is a random number generator.

73. The apparatus of claim 71, receive input data that conditions the probability distribution.

74. The apparatus of claim 71, further comprising:
a second stochastic circuit including zero or more second input terminals and at least one second output terminal, wherein the second stochastic circuit produces on the at least one second output line second samples from a second conditional probability distribution conditioned on second input data provided on the zero or more second input terminals,
wherein generation of the samples is based at least in part on the second conditional probability distribution and on a second source of randomness.

75. The apparatus of claim 74, wherein the samples and the second samples form a sample from a joint probability distribution based on the conditional probability distribution and the second conditional probability distribution.

76. The apparatus of claim 74, wherein the samples generated by the stochastic circuit are provided as input to the second stochastic circuit on the zero or more second input terminals such that the second conditional probability distribution is conditioned on the samples.

77. The apparatus of claim 76, wherein the second samples are generated from a marginal distribution of a joint probability distribution based on the conditional probability distribution and the second conditional probability distribution.

78. The apparatus of claim 71, wherein the stochastic circuit comprises:
a plurality of stochastic circuit elements, wherein each of the stochastic circuit elements comprises:
zero or more element input terminals, and
at least one element output terminal,
wherein each of the stochastic circuit elements generates samples from a conditional probability subdistribution conditioned on input received on the zero or more element input terminals, each sample being generated based on the conditional probability subdistribution and on a source of randomness,
wherein the conditional probability distribution of the first stochastic circuit is a joint distribution based on the plurality of conditional probability subdistributions, and
wherein the plurality of stochastic circuit elements are interconnected to form the first stochastic subcircuit that produces samples from a marginal distribution of the joint distribution.

79. A method of operating a stochastic circuit to generate samples from an overall conditional probability distribution, the overall conditional probability distribution being related to a plurality of conditional probability subdistributions, the method comprising:

concurrently operating two or more stochastic subcircuits such that each generate samples from a conditional probability subdistribution, wherein the concurrently operating comprises:
generating, during a first iteration, a first sample from a first stochastic subcircuit, the first sample being generated according to a first conditional probability distribution,
generating, during a second iteration, a second sample from the second stochastic subcircuit, the second sample being generated according to a second conditional probability distribution that is conditioned on the first sample, and
generating, during the second iteration, a next sample from the first stochastic subcircuit; and
generating a sample from an output subcircuit that is a sample from the overall conditional probability distribution.

80. The method of claim 1, further comprising:
repeating the acts of concurrently operating, exchanging, and generating to generate a plurality of samples from the overall conditional probability distribution.

81. The method of claim 1, further comprising:
performing at least one processing action on the sample generated in the act of generating.

82. The method of claim 81, wherein the at least one processing action comprises aggregating the sample with previously-generated samples and calculating probabilities that values will be generated as samples.

83. The method of claim 79, wherein the act of generating is performed randomly based on a source of randomness.

84. The method of claim 83, wherein the source of randomness is a pseudo-random number generator, and generating a sample randomly comprises generating a sample based at least in part on a random number produced by the pseudo-random number generator.

85. The method of claim 79, further comprising:
receiving input data; and
providing the input data to a stochastic subcircuit such that the stochastic subcircuit generates samples from a conditional probability distribution conditioned at least in part on the input data.

86. The method of claim 79, further comprising:
receiving configuration data relating to a desired probability distribution; and
configuring the stochastic circuit to generate samples from the desired probability distribution by interconnecting the two or more stochastic subcircuits based at least in part on the configuration data.

87. The method of claim 79, further comprising:
providing as an output of the stochastic circuit at least one value relating to a sample generated by the stochastic circuit.

88. The method of claim 87, wherein the at least one value comprises at least one sample generated by the stochastic circuit.

89. The method of claim 87, wherein the at least one value comprises a probability that a specific value will be generated as a sample by the stochastic circuit.

90. The method of claim 87, further comprising:
determining a solution to a stochastic problem based at least in part on the at least one value provided in the act of outputting.

91. The method of claim 79, wherein operating the two or more stochastic subcircuits concurrently comprises:
operating each of the two or more stochastic subcircuits according to a Gibbs transition kernel, such that the two or more stochastic subcircuits each generate a Markov chain of samples from the conditional probability subdistributions.

92. The method of claim 91, further comprising:
assigning to a plurality of stochastic subcircuits a corresponding node in a Markov Random Field (MRF); and
determining which of the nodes are independent of one another,
wherein the two or more stochastic subcircuits that are operated concurrently are stochastic subcircuits associated with nodes that are determined to be independent.

93. The method of claim 92, further comprising:
if it is determined that a first node of the MRF is interdependent on a second node of the MRF, configuring the stochastic circuit to reflect the interdependency by interconnecting a first stochastic subcircuit associated with the first node and a second stochastic subcircuit associated with the second node,
wherein the interconnecting comprises coupling an output of the first stochastic subcircuit to an input of the second stochastic subcircuit and coupling an input of the second stochastic subcircuit to an input of the first stochastic subcircuit.

94. The method of claim 93, wherein the act of concurrently operating the two or more stochastic subcircuits comprises:
concurrently operating the two or more stochastic subcircuits to carry out a Gibbs sampling algorithm.

95. The method of claim 79, wherein the act of concurrently operating the two or more stochastic subcircuits comprises:
concurrently operating the two or more stochastic subcircuits to carry out a Metropolis-Hastings sampling algorithm.

96. The method of claim 79, wherein the act of concurrently operating the two or more stochastic subcircuits comprises:
concurrently operating the two or more stochastic subcircuits to carry out a Markov Chain Monte Carlo sampling algorithm.

97. The method of claim 79, wherein the act of concurrently operating the two or more stochastic subcircuits comprises:
concurrently operating the two or more stochastic subcircuits to carry out a rejection sampling algorithm.

98. The method of claim 79, wherein the act of concurrently operating the two or more stochastic subcircuits comprises:
concurrently operating the two or more stochastic subcircuits to carry out an importance sampling algorithm.

99. The method of claim 79, wherein the samples may be used in solving a stereovision problem.

* * * * *